United States Patent
Nakagawa et al.

(10) Patent No.: US 7,188,299 B2
(45) Date of Patent: Mar. 6, 2007

(54) DATA-RECORDING/REPRODUCTION APPARATUS AND DATA-RECORDING/REPRODUCTION METHOD

(75) Inventors: Toshiyuki Nakagawa, Kanagawa (JP); Keitarou Kondou, Tokyo (JP); Hiroaki Eto, Kanagawa (JP); Yoshihide Shimpuku, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 10/487,606

(22) PCT Filed: Jul. 22, 2003

(86) PCT No.: PCT/JP03/09256

§ 371 (c)(1),
(2), (4) Date: Feb. 24, 2004

(87) PCT Pub. No.: WO2004/010433

PCT Pub. Date: Jan. 29, 2004

(65) Prior Publication Data

US 2005/0005193 A1  Jan. 6, 2005

(30) Foreign Application Priority Data

Jul. 23, 2002  (JP) ............................. 2002-214318

(51) Int. Cl.
G11C 29/00 (2006.01)
G06F 11/00 (2006.01)
G11B 15/52 (2006.01)

(52) U.S. Cl. ...................... 714/763; 714/746; 369/47.1

(58) Field of Classification Search ..................... None
See application file for complete search history.

(56) References Cited

U.S. PATENT DOCUMENTS

| | | | |
|---|---|---|---|
| 5,335,117 A * | 8/1994 | Park et al. | 360/48 |
| 5,592,343 A * | 1/1997 | Park et al. | 360/48 |
| 5,781,565 A * | 7/1998 | Sako et al. | 714/755 |
| 5,835,509 A * | 11/1998 | Sako et al. | 714/755 |
| 6,567,951 B2 * | 5/2003 | Senshu | 714/769 |

* cited by examiner

*Primary Examiner*—Phung My Chung
(74) *Attorney, Agent, or Firm*—Lerner, David, Littenberg, Krumholz & Mentlik, LLP

(57) ABSTRACT

In order to reproduce data in a stable manner by correction of random and burst errors of a wide range without lowering a transfer speed, C2 error correction for correcting an inter-sector error is carried out in addition to the conventional C1 error correction for correcting an error generated in a sector. The configuration of an error correction unit (or an ECC block) including C1 and C2 codes is formed as a track. That is to say, one track is used as the base of an ECC block unit. In this way, two ECC block units never exist in the same track.

17 Claims, 14 Drawing Sheets

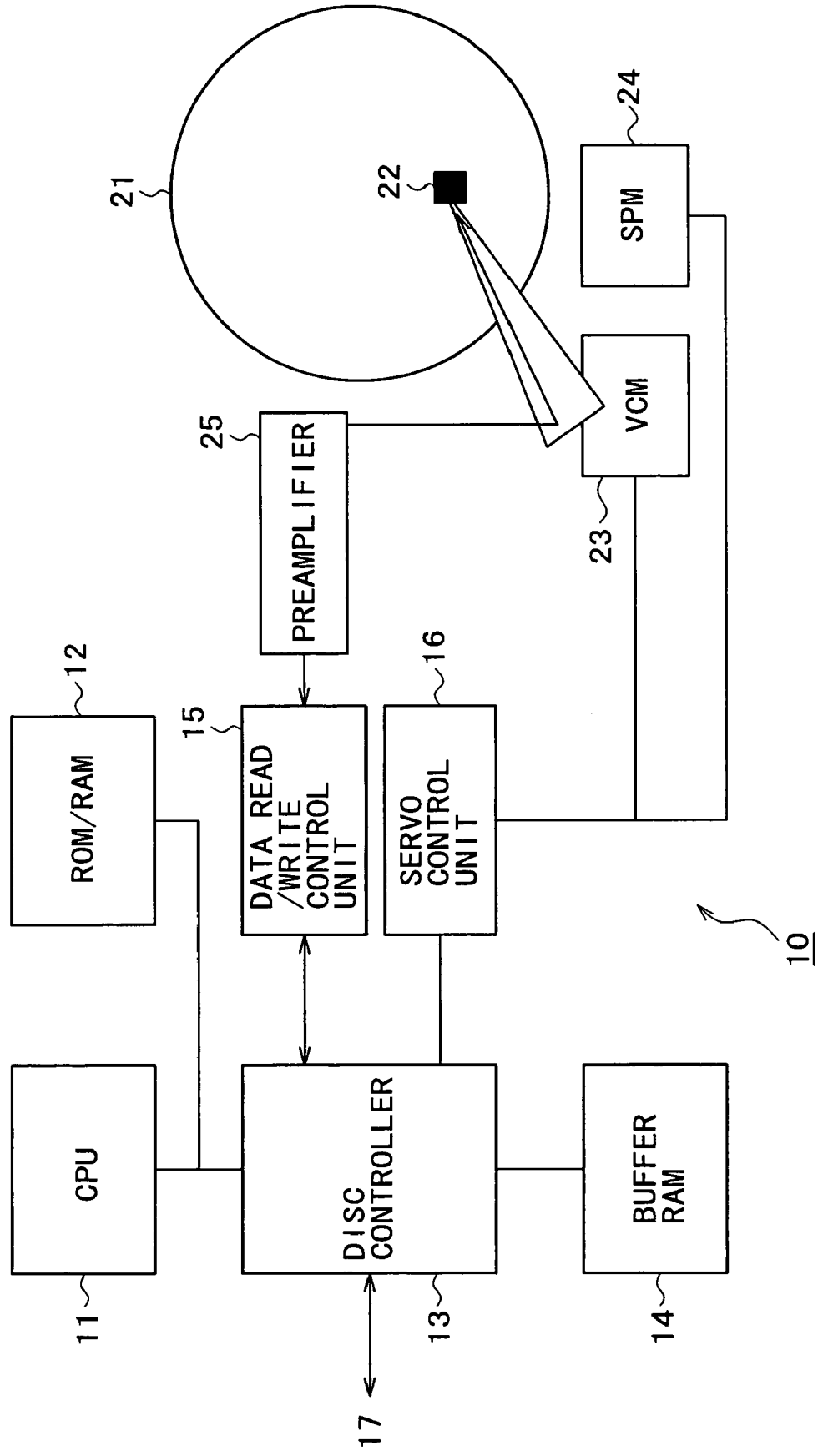

FIG. 12

| 0 | header 0 |
|---|---|
| 1 | header 1 |
| 2 | header 2 |
| 3 | DATA 0, 0 |
| 4 | DATA 1, 0 |
| 5 | DATA 2, 0 |
| 6 | DATA 0, 1 |
| 7 | DATA 1, 1 |
| 8 | DATA 2, 1 |
| 9 | DATA 0, 2 |
| ... | ... |
| 510 | DATA 0, 169 |
| 511 | DATA 1, 169 |
| 512 | DATA 2, 169 |
| 513 | DATA 0, 170 |
| 514 | DATA 1, 170 |
| 515 | CRC 0 |
| 516 | CRC 1 |
| 517 | CRC 2 |
| 518 | CRC 3 |
| 519 | Parity 0, 00 |
| 520 | Parity 1, 00 |
| 521 | Parity 2, 00 |
| 522 | Parity 0, 01 |
| ... | ... |
| 552 | Parity 0, 11 |
| 553 | Parity 1, 11 |
| 554 | Parity 2, 11 |

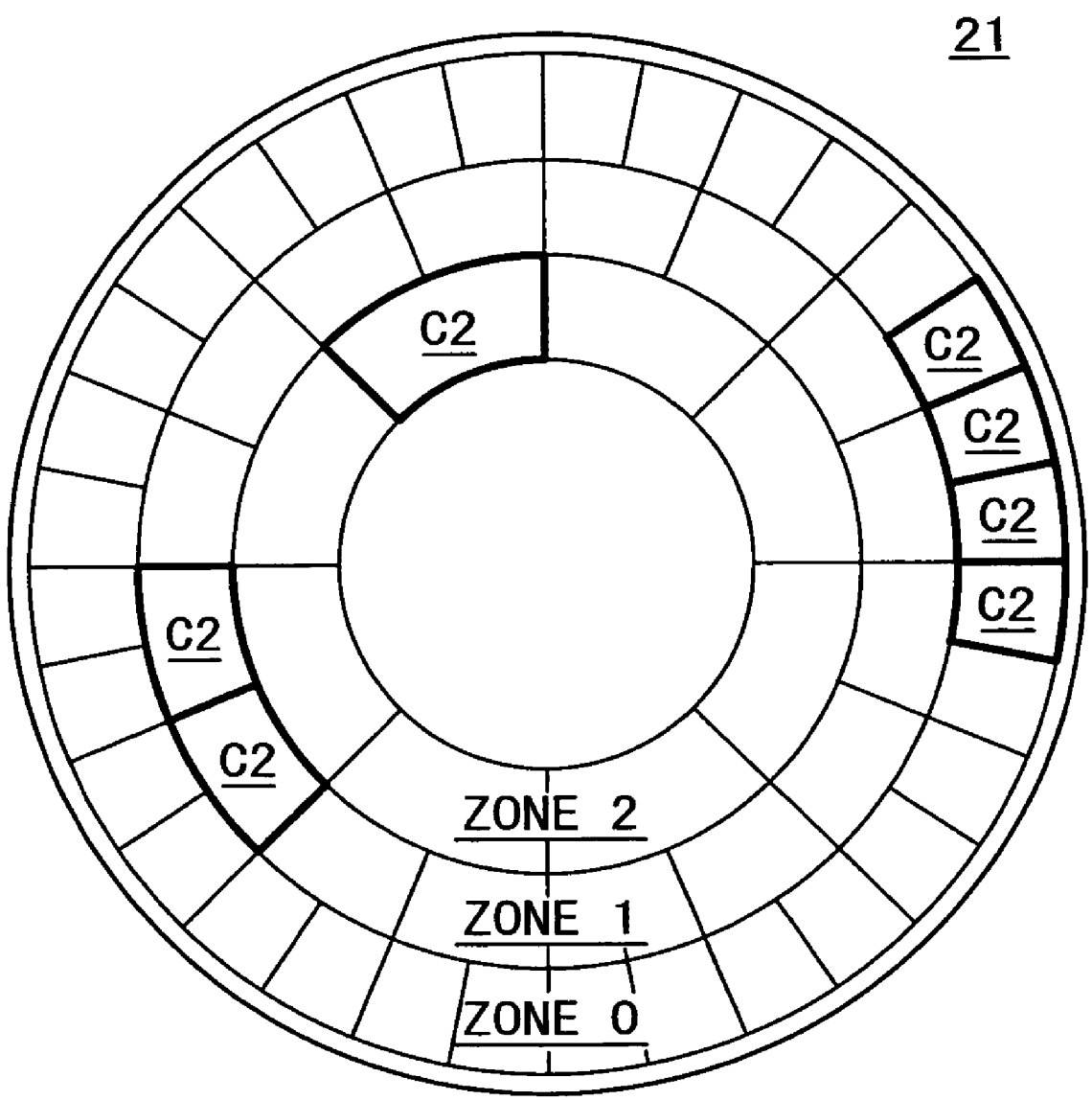

F I G. 1 4
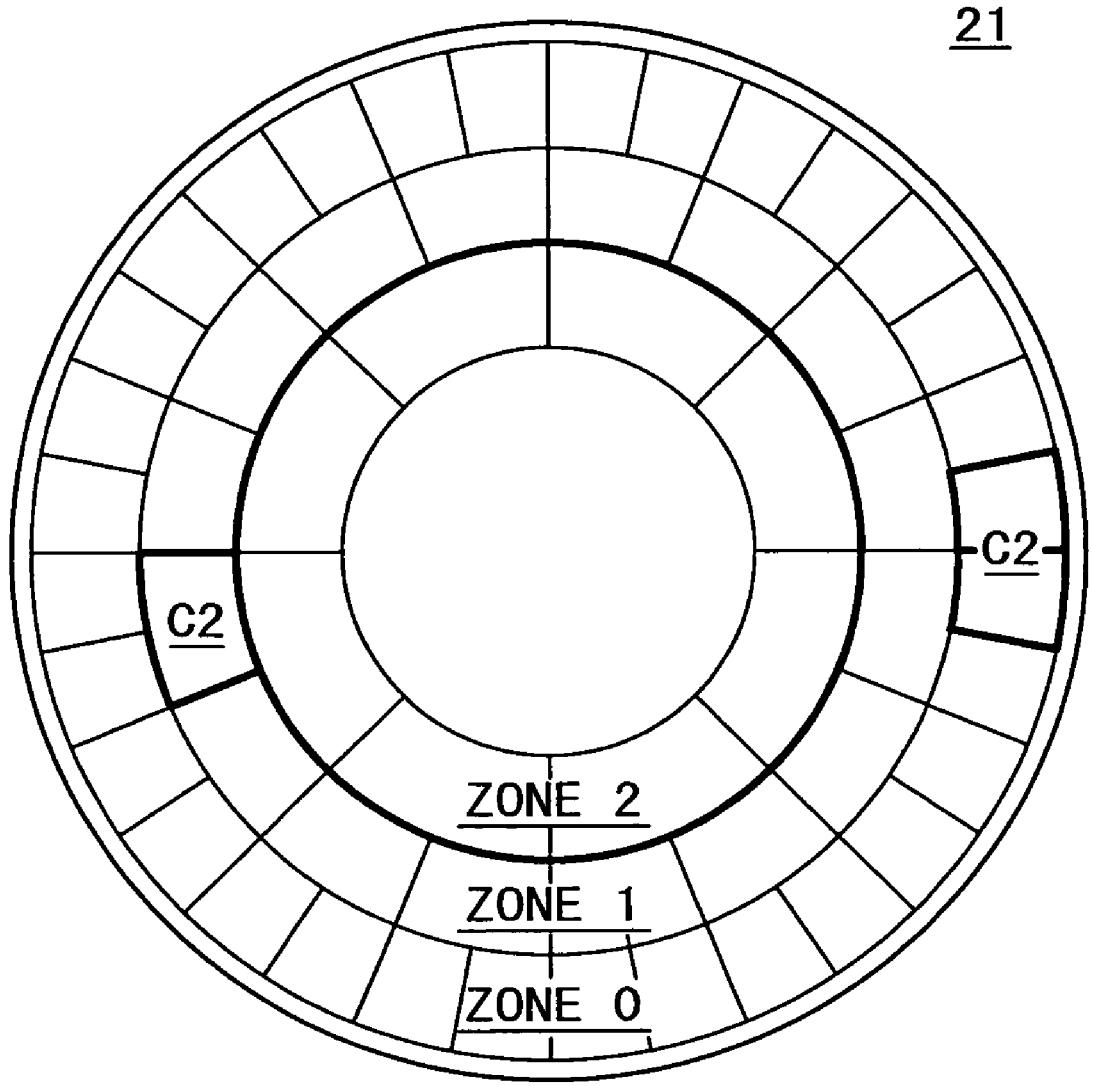

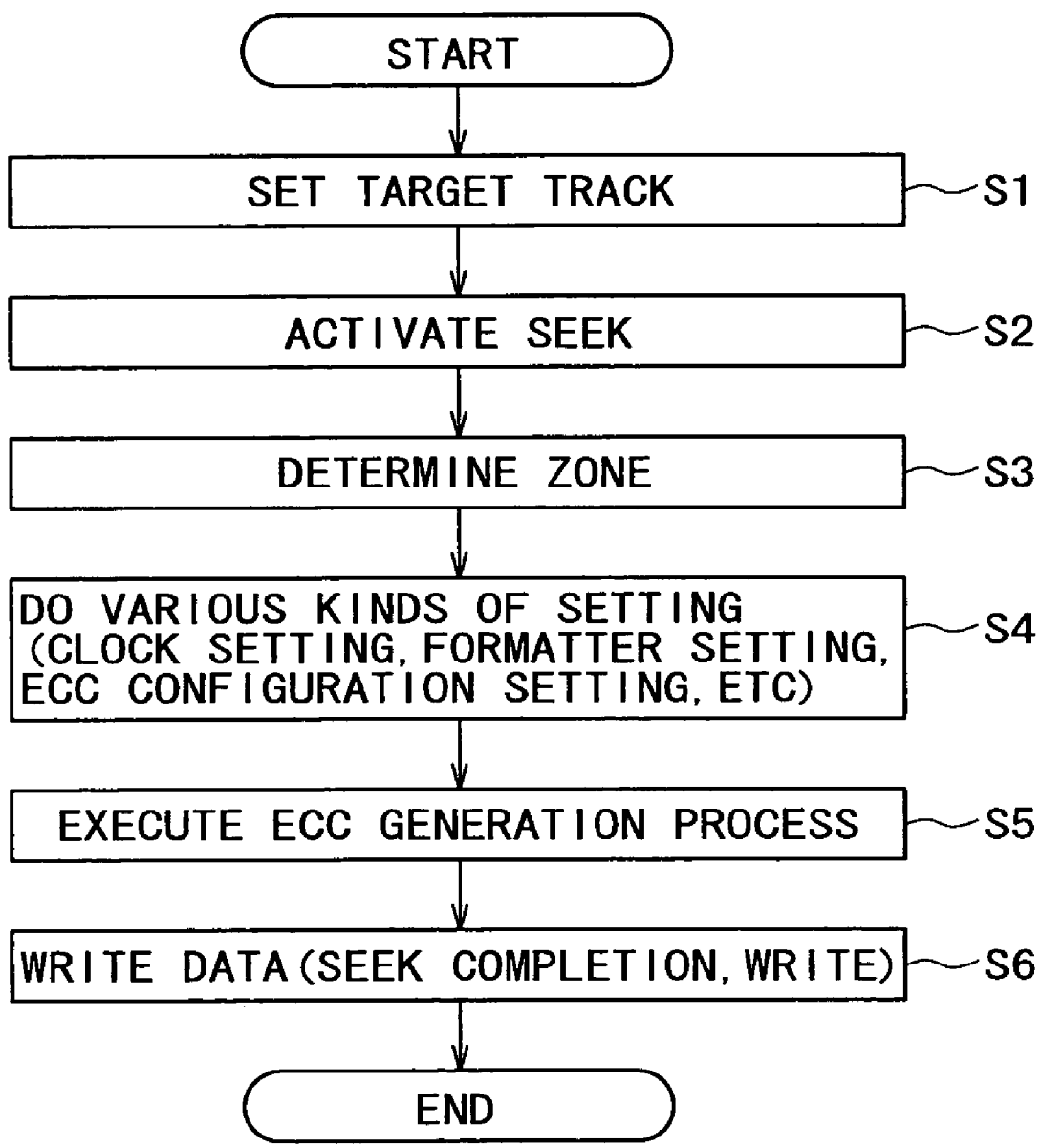

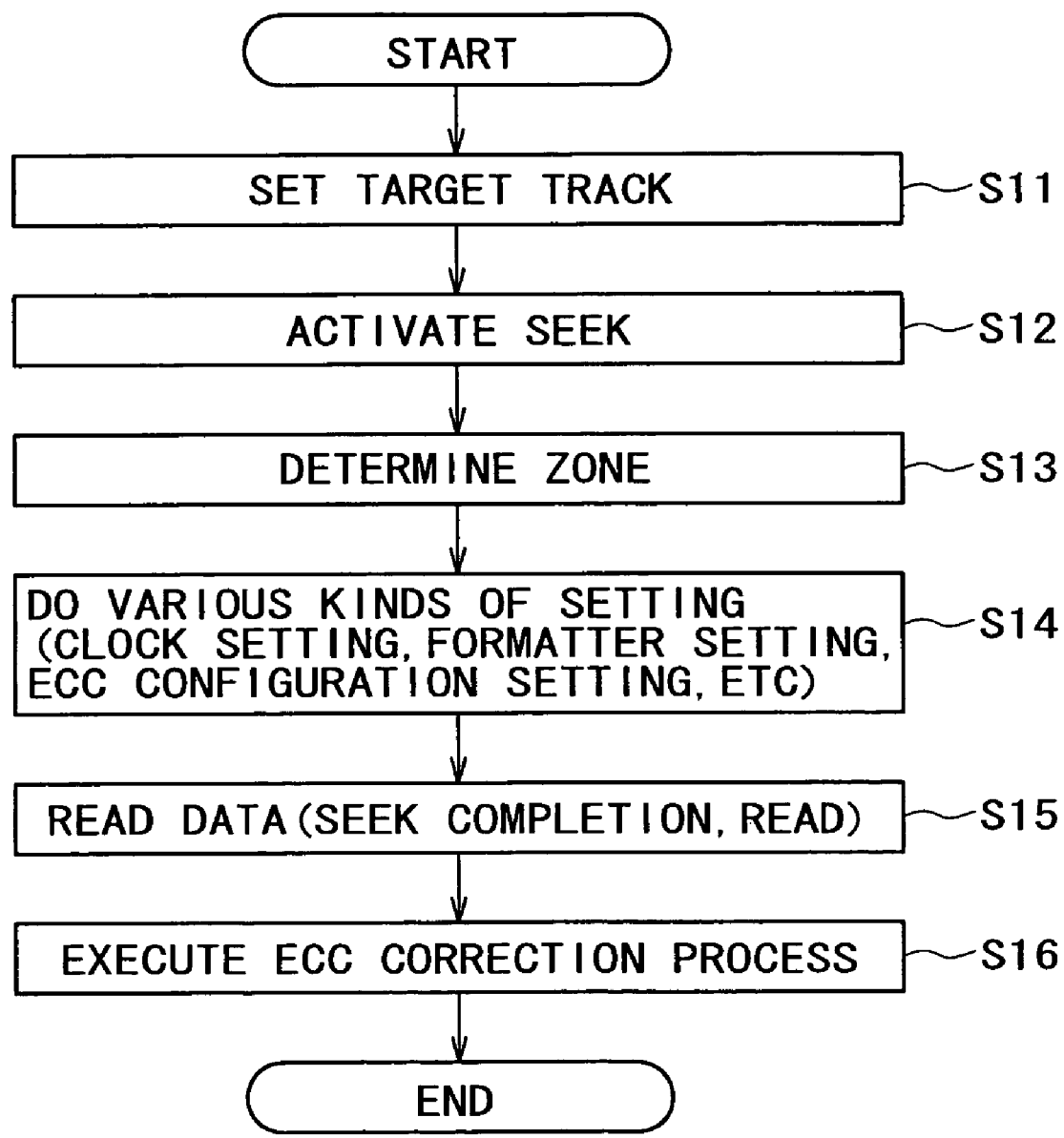

DATA-RECORDING/REPRODUCTION APPARATUS AND DATA-RECORDING/REPRODUCTION METHOD

TECHNICAL FIELD

The present invention relates to a data-recording/reproduction apparatus for a random-accessible recording medium, a data-recording/reproduction method adopted by the apparatus and a computer program implementing the method. More particularly, the present invention relates to a data-recording/reproduction apparatus for a magnetic disk used as a disk-shaped recording medium which data is written into and read out from by a scanning magnetic head as is the case with media such as a hard disk as well as relates to a data-recording/reproduction method adopted by the apparatus and a computer program implementing the method.

To put it in more detail, the present invention relates to a data-recording/reproduction apparatus allowing data to be reproduced from a recording medium in a stable manner while making an attempt to shorten the time it takes to make an access to a storage location of desired data as well as relates to a data-recording/reproduction method adopted by the apparatus and a computer program implementing the method. More particularly, the present invention relates to a data-recording/reproduction apparatus allowing data to be reproduced from a recording medium in a stable manner without generation of a rotation wait state and without generation of a delay time caused by a seek operation in a wasteful process to pre-fetch data from the recording medium as well as relates to a data-recording/reproduction method adopted by the apparatus and a computer program implementing the method.

BACKGROUND ART

With development of information technologies such as information processing and information communications, it becomes necessary to reutilize information created and edited in the past. For this reason, the information storage technology becomes important more and more. So far, information-recording apparatus using various kinds of media have been developed and become popular. The media used in the information-recording apparatus includes a magnetic tape and a magnetic disk.

An example of the magnetic disk is a disk embedded in an HDD (Hard Disk Drive) used as an auxiliary storage apparatus adopting a magnetic recording method. A drive unit accommodates several pieces of magnetic media, which each serve as a recording medium. A spindle motor rotates the pieces of recording media at high speed. Each piece of magnetic media is coated with a magnetic substance plated with a material such as nickel or phosphor. A magnetic head scans the face of the rotating media in the radial direction to write data onto the media by generating magnetization corresponding to the data on the face of the media, or to read out data from the media.

The hard disk has already become generally and widely popular. For example, the hard disk is employed in a personal computer as a standard external storage device in which various kinds of software are installed and created as well as edited files are stored. The software installed in the hard disk includes an operating system (OS) for starting up the computer and application programs. Usually, the hard disk drive employing the hard disk is connected to the main unit of the personal computer through a standard interface such as an IDE (Integrated Drive Electronics) interface or an SCSI (Small Computer System Interface). A file system manages storage areas of the hard disk. The file system is a sub-system of the operating system. The file system includes a FAT (File Allocation Table).

Recently, efforts to increase the storage capacity of the hard disk are in progress. Accompanying the progress of the efforts to increase the storage capacity of the hard disk, the application field of the hard disk is widened to include apparatus such as a hard-disk recorder for storing AV (audio and visual) contents received from a broadcasting station, and the use of the hard disk as a storage unit for storing contents as well as the conventional use thereof as an auxiliary storage apparatus of a computer is started.

By taking a case of using the hard disk as an auxiliary storage apparatus of a computer as an example, the following description considers a method of physically formatting the hard disk and an operation to write data onto the hard disk.

As partitions for recording data onto the hard disk, a number of concentric tracks are formed on the hard disk. Increasing sequence numbers 0, 1 and so on are assigned to the tracks starting with the track on the outermost circumference as track numbers in a direction toward the track on the innermost circumference. The larger the number of tracks created on the surface of the hard disk, the larger the storage capacity of the hard disk serving as recording media.

In addition, each of the tracks is divided into sectors each used as a recording unit. Normal operations to read out and write data from and onto the hard disk are carried out in sector units. The size of the sector varies from media to media. However, the size of the sector of a hard disk is generally set at a fixed value of 512 bytes. In addition, in order to make the recording density uniform for all the tracks by taking the efficiency of the utilization of the media into consideration, each of the tracks is divided into such a number of sectors that, the farther the location of a track from the center of the hard disk, the larger the number of sectors included in the track. This is because, the larger the radius of a circumference on which a track is created on the hard disk, the longer the circumference and, hence, the longer the track. The technique to provide each of the tracks with sectors in this way is referred to as a 'Zone Bit Recording' method.

In addition, in the case of an HDD with a configuration in which several pieces of media overlap with each other with their centers aligned along a straight line, tracks each created on one of the pieces of media as tracks having the same track number can be considered as tracks forming the wall of a cylinder. As a matter of fact, such tracks are referred to as a cylinder. The same track number assigned to tracks forming a cylinder is used as a cylinder number assigned to the cylinder. Much like the track numbers, cylinder numbers are increasing sequence numbers 0, 1 and so on, which are assigned to cylinders starting with the cylinder on the outermost circumference of the HDD in a direction toward a cylinder on the innermost circumference. A plurality of heads each inserted into a gap between 2 adjacent pieces of media always moves from one cylinder to another as a single assembly.

A CHS mode can be given as a kind of addressing, which is a method of specifying a target sector. The CHS mode is a method of making an access to desired data by specifying the PBA (Physical Block Address) of a location on a disk-like piece of recording media as the PBA of the location of the target sector in a format including parameters arranged in a C (Cylinder), H (Head) and S (sector) sequence.

With the CHS method, on the other hand, there is a limit on CHS parameters that can be specified in the main unit of a computer serving as the host of the HDD, and the limit does not allow the addressing to keep up with the rising storage capacity of the hard disk. In order to solve this problem, an LBA (Logical Block Address) mode is adopted. An LBA is expressed as logical sequence numbers including a cylinder number, a head number and a sector number, which each start from 0.

In the conventional HDD, in order to read out data from recording media by making an access to the media, first of all, the magnetic head is moved over the recording media in a seek operation to a track having a target sector containing the data. Then, the magnetic head waits for the desired sector on the rotating recording media to arrive at a position right under the magnetic head. This state of waiting for the desired sector on the rotating recording media to arrive at a position right under the magnetic head is referred to as a rotation wait.

In general, the storage capacity of the disk can be increased as the track density raises and the track density can be raised as the width of the track decreases. Thus, in order to write and read out data into and from a track with a high degree of accuracy, high precision of the positioning of the magnetic head is required. In order to meet this requirement, there is adopted a servo technique for always adjusting the position of the magnetic head to the center of a track containing the target sector. The servo technique is based on signals recorded on each track at fixed intervals. These signals are referred to as a servo pattern. By reading out this servo pattern from a track through use of the magnetic head, it is possible to check whether or not the magnetic head is positioned at the center of the track. The servo pattern is embedded on each track with a high degree of precision in advance when the HDD is made in a manufacturing process. A servo area is used for recording the signals for positioning the magnetic head and information such as a cylinder number, a head number and a servo number.

A number of conventional HDDs adopt an interface such as the IDE or SCSI interface intended for connecting an HDD to a computer. In a basic operation, the main unit of a computer controls a disk drive by using a set of commands defined by the interface. In general, a command specifies an LBA indicating a head sector of sectors to be accessed and the number of cited sectors.

Receiving such a command, the HDD makes an access to the specified head sector and, then, makes an access to each of the subsequent sectors while creating a pre-fetch sequence by predicting which sectors are to be accessed.

In the creation of a pre-fetch sequence, it is assumed that a data series is stored in sectors having continuous addresses. Usually, sectors having continuous addresses exist at locations to be accessed by magnetic heads having continuous head numbers or exist on a track having a track number.

If data of a large amount has been stored in recording media, a pre-fetch operation is an effective operation to read out the data from the recording media.

However, the recording area gets fragmented more and more so that a large data file must be stored in a plurality of small areas physically separated from each other in a state wherein the data is dispersed in the areas. In such a case, carrying out a pre-fetch operation will read but inadvertently data other than desired one. That is to say, a pre-fetch operation will not work effectively. Such a phenomenon can occur due to the fact that the HDD does not grasp the structure of a file being dealt with by the host such as a computer main unit making a request for an operation to read out data from the recording medium.

In addition, a target sector of a new access request made by the host may be off from a predicted sequence of sectors. In this case, the disk drive must carry out a seek operation to find a track including the target sector containing the data specified in the request. As the tracking operation, that is, the seek operation to find the track including the target sector, is completed, the head enters a state of waiting for the sector to become accessible. In this way, it takes time to complete the tracking operation and to wait for the sector to become accessible.

It is possible to keep as much data as allowed by the storage capacity of a data buffer. If the event in which the target sector of a new access is off from a predicted sequence of sectors happens consecutively or sporadically, pieces of data that have already been stored in the data buffer but are not to be used must be discarded sequentially starting with the one stored in the buffer least recently. In addition, a seek operation cannot be activated while a pre-fetching operation is being carried out.

As is obvious from the above descriptions, a seek time, a rotation wait time and a seek-operation delay time caused by a wasteful pre-fetch operation can each be a time loss whereas data read out from the disk in a wasteful pre-fetch operation can be a data loss.

In an ordinary disk drive, the rotating speed of the disk is raised in order to shorten the seek and rotation-wait times. This is because it is difficult to make an improvement by adopting a new access method due to the fact that there is no rule in the amount and structure of data handled by the host such as a computer.

In addition, most of the conventional external storage systems such as an HDD correct errors for each sector unit normally consisting of 512 bytes. Thus, a random error occurring in each sector can be corrected. However, it is not possible to correct an error beyond a correctable domain or burst errors. In order to solve this problem, a retry operation is carried out in an attempt to confine the number of read errors within a predetermined limit.

However, a retry operation is carried out to again read out data from a recording medium after a required state of waiting for a disk rotation. Thus, the operation to again read out data from a recording medium further increases the delay time.

For example, a system handling AV contents may be put in a situation wherein a high transfer speed is requested for carrying out an HD (high definition) reproduction process or a special reproduction process. In such a case, there may be no time margin for carrying out a retry operation even if an irrecoverable read error is detected in a sector. At such a time, with the contemporary technology, the reproduction process is continued with the error remaining uncorrected as it is. As a result, the quality of the reproduced data deteriorates.

DISCLOSURE OF INVENTION

It is thus an object of the present invention addressing the problems described above to provide an excellent data-recording/reproduction apparatus with short time it takes to make an access to the storage location of desired data as well as provide an excellent data-recording/reproduction apparatus to be adopted by the apparatus and a computer program implementing the method.

It is another object of the present invention to provide an excellent data-recording/reproduction apparatus capable of reproducing data in a stable manner without lowering a transfer speed as well as provide an excellent data-recording/reproduction method to be adopted by the apparatus and a computer program implementing the method.

It is a further object of the present invention to provide an excellent data-recording/reproduction apparatus capable of correcting random and burst errors of a wider range and capable of reproducing data in a stable manner without lowering a transfer speed by avoidance of retry operations as well as provide an excellent data-recording/reproduction method to be adopted by the apparatus and a computer program implementing the method.

First of all, a configuration for shortening the access time is implemented in a data access control apparatus described in an invention specification of Japanese Patent application No. 2002-42634, already granted to the patent applicant. (The invention itself was not disclosed at the application time) The data access control apparatus is capable of well carrying out operations to read out and write data from and onto a magnetic disk used as recording media while moving a magnetic head over the magnetic disk in a scanning operation. It is to be noted that the specification of the Japanese Patent application No. 2002-42634 is incorporated in the present specification and the invention described in the specification cited above can thus be treated as one aspect of the present invention.

In accordance with the data access control apparatus described in the invention specification cited above, a magnetic head makes an access to data of the amount equivalent to one track starting from an on-tracked sector, that is to say, by using one track as an access unit, an indeterminate pre-fetch process can be eliminated and the timing of the start a seek operation can be determined with a high degree of certainty. In addition, since any sector on a track can be used as an on-tracked sector at which an access to the track is started, a rotation wait time is not required anymore. This is because a read and a write operation can be started from any arbitrary position of the magnetic head right after a seek operation. As a result, the number of seek operations can be reduced to a minimum and the access time can be shortened.

In addition, the data access control apparatus described in the specification cited above typically uses a sector data format. In accordance with the sector data format, at the time of an access to write data into a track, pieces of relative-position information are sequentially assigned to sectors on the track, starting with a sector from which the access to the track is started, and the pieces of relative-position information are each included in a piece of data written in any one of the sectors. As an alternative, the data access control apparatus uses a recorded-data format of an ECC configuration capable of restoring relative-position information. Thus, an originator of a request for a write operation does not need to be aware of the address of a sector existing on the disk as a target sector of the write access. An example of the originator of a request for a write operation is a host apparatus such as a computer connected to the HDD. In addition, at the time of an access to read out data from a track, pieces of data each read out from a sector on the track are typically stored in a buffer memory in accordance with relative-position addresses so that the pieces of data can be assembled to obtain the original data without regard to the position of a sector at which the access is started. Furthermore, by using relative-position addresses allowing a small size of data, storage areas can be utilized efficiently.

In addition, in accordance with a first aspect of the present invention, there is provided a data-recording/reproduction apparatus for recording data onto a disk-shaped recording medium including concentric recording tracks each divided into sectors by splitting the data into predetermined quantities each to be recorded onto one of the sectors each used as a minimum access unit and for reproducing the data from the disk-shaped recording medium. The data-recording/reproduction apparatus includes:

recording/reproduction means for recording and reproducing data onto and from the disk-shaped recording medium;

transport means for transporting the recording/reproduction means to a predetermined one of the recording tracks on the disk-shaped recording medium;

access control means for executing control to make an access to data of an amount equivalent to one recording track by starting the access from one of the sectors existing in the predetermined recording track as a first sector accessible to the recording/reproduction means transported to the predetermined recording track;

first error-correction-code generation means for generating a first error correction code for correcting an error generated in a first predetermined data amount unit of the accessed data of an amount equivalent to one recording track; and second error-correction-code generation means for generating a second error correction code for correcting an error generated in a plurality of the first predetermined data amount units. Only one error correction code block including the generated first error correction code and the generated second error correction code is generated for each of the recording tracks.

In addition, the data-recording/reproduction apparatus according to the first aspect of the present invention may be provided with: first error correction means for correcting an error generated in the first predetermined data amount unit of the accessed data of an amount equivalent to one recording track on the basis of the first error correction code; and second error correction means for correcting an error generated in a plurality of the first predetermined data amount units on the basis of the second error correction code.

In accordance with the data-recording/reproduction apparatus according to the first aspect of the present invention, by using the unit of the first error correction code, a random error in an error correction range can be corrected. By using the unit of the second error correction code, on the other hand, a random and burst errors beyond the error correction range can be corrected. Thus, a more stable system can be provided.

In the data-recording/reproduction apparatus, the first or second error-correction-code generation means may generate a first or second error correction code respectively by adoption of a Reed-Solomon encode method.

In addition, the first or second error correction means may be configured to prevent two or more error correction blocks from existing in a track and to completely form an error correction block as one track or a plurality of tracks. That is to say, by completely forming an error correction block as one disk circumference or a plurality of disk circumferences, it is possible to shorten the time which takes to make an access to a recording location for storing desired data. In addition, since two or more error correction code blocks never exist in each track, it is possible to implement data access control incurring no rotation wait even if the error correction code configuration is composed of a plurality of track units.

On the disk-shaped recording medium, a plurality of tracks is created and each of the tracks is divided into a plurality of sectors.

It is also possible to provide an implementation of the data-recording/reproduction apparatus wherein, at a time to write data onto the disk-shaped recording medium, the access control means sequentially assigns relative-position addresses to the sectors on the predetermined recording track in an order starting with one of the sectors included in the predetermined recording track as a sector, from which a write access is started and, at a time to read out pieces of data from the disk-shaped recording medium, the pieces of data read out from the sectors in the predetermined recording track are relocated on the basis of the relative-position addresses.

By execution of such data access control on the recording area of the disk-shaped recording medium, an access is made to data having an amount equivalent to one track starting from an on-tracked sector on a recording track beneath a magnetic head where the on-tracked sector is defined as a first sector accessible to the magnetic head. That is to say, by taking one track as an access unit, the indeterminate prefetch processing can be eliminated and the timing to start a seek operation can be determined with a high degree of certainty. In addition, since an access to a recording track can be started from any sector on the track, operations to read out and write data from and into the track can be started from any sector included in the track as a sector reached by the magnetic head at the end of a seek operation so that the rotation wait can be eliminated. As a result, the number of seek operations can be reduced to a minimum and the access time can hence be shortened. Accordingly, in accordance with the data-recording/reproduction apparatus according to the first aspect of the present invention, random and burst errors of a broader range can be corrected so that retry operations can be eliminated. As a result, data can be reproduced in a stable manner without lowering the transfer speed.

The disk-shaped recording medium conforms to a Zone Bit Recording method in which the number of sectors included in each of the recording tracks is varied in dependence on the location of the recording track in the radial direction of the disk-shaped recording medium.

In this case, the first or second error-correction means adopts an error correction block configuration changing from zone to zone. By making the configuration of the error correction block variable in dependence on a zone in a predetermined disk delimiter as such, the ability of error correction can be made uniform for all circumferences of the disk and an efficient disk format can be created.

In addition, the first or second error correction means may change over the configuration of the error correction block from one to another in accordance with zone change-over information.

Furthermore, the configuration of the error correction block can be changed by changing the configuration of the second error correction code unit or the configuration of the first error correction code unit.

Moreover, the configuration of a sector serving as the first error correction code unit can be changed by changing the number of bytes composing the sector and the parity count of the sector.

In addition, the configuration of the second error correction code unit can be changed by changing the number of sectors composing the second error correction code unit and the number of parity sectors included in the unit.

Furthermore, the configuration of the error correction block may include extra error correction codes as long as the redundancy of the error correction codes does not exceed a predetermined limit.

Moreover, the error correction block may adopt an interleave structure for the first or second error correction code unit. By adopting an interleave structure in the block of an error correction block, it is possible to implement a stable system taking a hardware configuration into consideration.

In addition, it is also possible to provide an implementation of the data-recording/reproduction apparatus wherein the first or second error correction means selects the first and second error correction code units, only the first error correction code unit or only the second error correction code unit as the basis of error correction in dependence on a predetermined command.

Furthermore, the first or second error correction means may have an error correction block composed of only the first error correction code units, excluding the second error correction code units.

As an example, consider data having a size sufficiently large in comparison with the size of a track and requires a transfer speed at least equal to a predetermined value. An example of such data is an AV content. An AV content is put in an error correction block including the first and second error correction code units. On the other hand, other data not requiring a high transfer speed in a strict manner is put in an error correction block including only the first error correction code unit. Examples of this other data are header information and an ordinary computer file. By applying different formats to different kinds of data to be recorded as described above, read and write operations can be carried out with a high degree of efficiency.

In addition, in accordance with a second aspect of the present invention, there is provided a data-recording/reproduction method for recording data onto a disk-shaped recording medium including concentric recording tracks each divided into sectors by splitting the data into predetermined quantities each to be recorded onto one of the sectors each used as a minimum access unit and for reproducing the data from the disk-shaped recording medium. The data-recording/reproduction method includes the steps of:

transporting recording/reproduction means for recording and reproducing data onto and from the disk-shaped recording medium to a predetermined one of the recording tracks on the disk-shaped recording medium;

executing control to make an access to data of an amount equivalent to one recording track by starting the access from one of the sectors existing in the predetermined recording track as a first sector accessible to the recording/reproduction means transported to the predetermined recording track;

generating only one error correction block including a first error correction code and a second error correction code for each of the recording tracks in an operation to record data to the disk shaped recording medium, the first error correction code correcting an error generated in a first predetermined data amount unit of the accessed data of an amount equivalent to one recording track, the second error correction code correcting an error generated in a plurality of the first predetermined data amount units.

In addition, in accordance with a third aspect of the present invention, there is provided a data-recording/reproduction apparatus including:

access control means for executing control to make an access to data of an amount equivalent to one recording track by starting the access from one of sectors existing in a predetermined recording track as a first sector accessible to a recording/reproduction means transported to the predetermined recording track;

first error-correction-code generation means for generating a first error correction code for correcting an error generated in a first predetermined data amount unit of the accessed data of an amount equivalent to one recording track; and second error-correction-code generation means for generating a second error correction code for correcting an error generated in a plurality of the first predetermined data amount units. Only one error correction code block including the generated first error correction code and the generated second error correction code is generated for each recording track.

In addition, in accordance with a fourth aspect of the present invention, there is provided a data-recording/reproduction apparatus for recording data onto a disk-shaped recording medium including concentric recording tracks each divided into sectors by splitting the data into predetermined quantities each to be recorded onto one of the sectors each used as a minimum access unit and for reproducing the data from the disk-shaped recording medium. The data-recording/reproduction apparatus includes:

recording/reproduction means for recording and reproducing data onto and from the disk-shaped recording medium;

transport means for transporting the recording/reproduction means to a predetermined one of the recording tracks on the disk-shaped recording medium;

access control means for executing control of sequentially assigning relative-position addresses to the sectors on the predetermined recording track in an order starting with one of the sectors that becomes first accessible to the recording/reproduction means transported to the predetermined recording track and writing data of an amount equivalent to one recording track into the predetermined recording track, and reading out data of an amount equivalent to one recording track from the sectors on the predetermined recording track starting from one of the sectors that becomes first accessible to the recording/reproduction means transported to the predetermined recording track at a time of reproducing the data from the disk-shaped recording medium; and error-correction-code generation means for generating predetermined error correction codes to be included in data recorded at a time to write the data onto the disk-shaped recording medium along with the relative-position addresses.

In accordance with any one of the aspects of the present invention, there is provided a control method adopted by a driving apparatus to carry out operations to write and read out data into and from a recording medium including a plurality of tracks formatted differently as tracks each used for storing data and servo by using one head or a plurality of heads. The control method may have a configuration based on one including:

a process of driving the driving apparatus to start a seek operation to find a specified track;

a process of driving the driving apparatus to perform on-track of the head to the specific track; and a process of driving the driving apparatus to write data of an amount equivalent to one track into the specified track without specifying the ID of a start sector in the specified track.

Still further objects of the present invention as well as its characteristics and advantages offered by the present invention will become apparent from a study of the following detailed descriptions explaining embodiments of the present invention with reference to accompanying diagrams.

BRIEF DESCRIPTION OF DRAWINGS

FIG. 1 is a diagram showing a model of the entire configuration of an HDD 10 implemented by an embodiment of the present invention;

FIG. 12 is another diagram showing the typical application of interleaves to the configuration of the ECC block provided by the embodiment;

FIG. 13 is a diagram showing a model of a disk format for an ECC block changed from zone to zone;

FIG. 14 is a diagram showing another embodiment for an ECC block configuration changed from zone to zone;

FIG. 15 shows a flowchart representing processing operations carried out in the disk controller 13 in a process to write data onto the disk; and FIG. 16 shows a flowchart representing processing operations carried out in the disk controller 13 in a process to read out data from the disk.

BEST MODE FOR CARRYING OUT THE INVENTION

Figure 2:
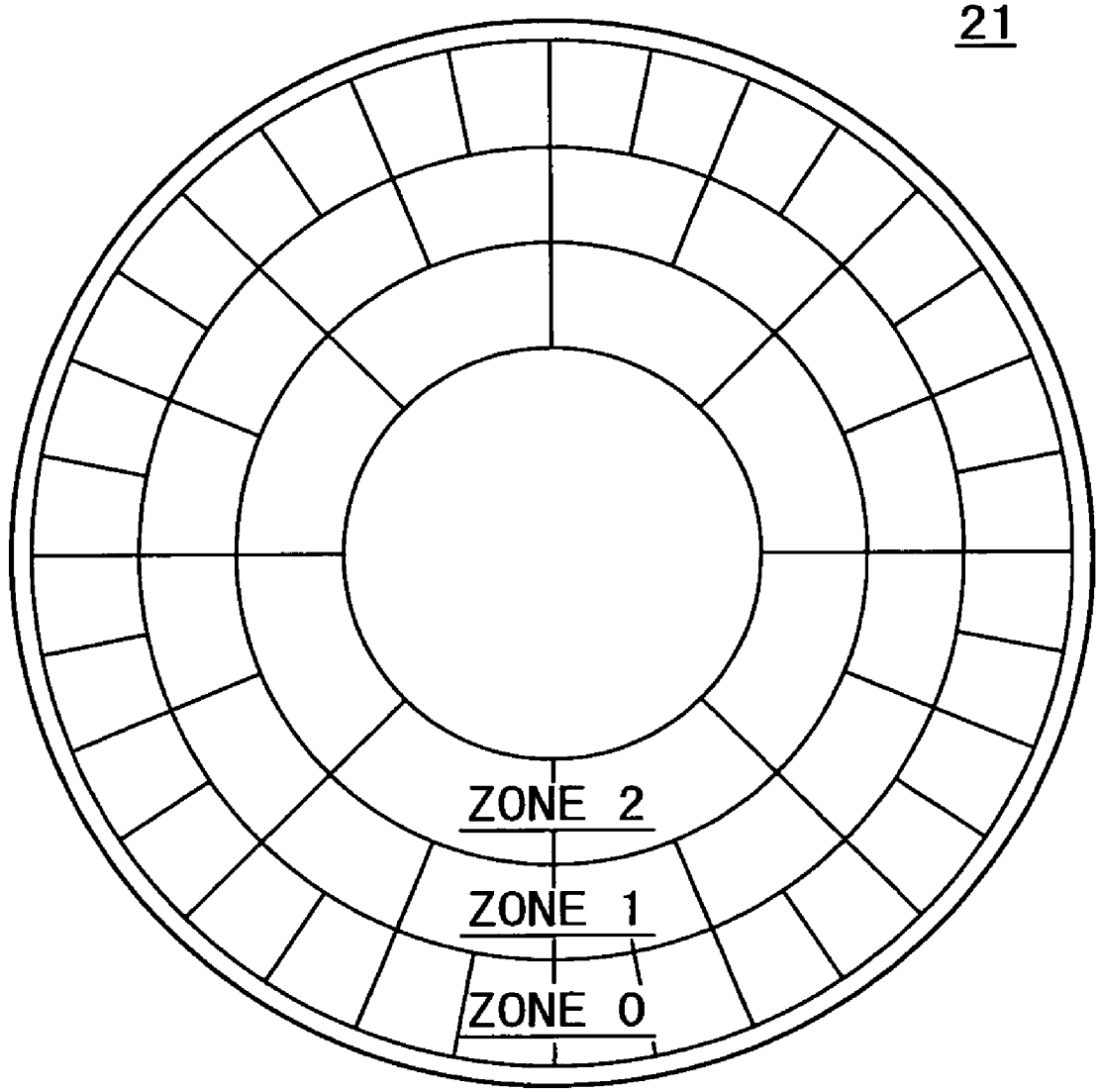
FIG. 2 is a diagram showing a typical Zone Bit Recording method.

Embodiments of the present invention are explained in detail by referring to the figures as follows.

FIG. 1 is a diagram showing a model of the entire configuration of an HDD 10 implemented by an embodiment of the present invention.

As shown in the figure, the HDD 10 comprises a CPU (Central Processing Unit) 11, a ROM (Read Only Memory)/

RAM (Random Access Memory) 12, a disk controller 13, a buffer RAM 14 a data read/write control unit 15 and a servo control unit 16.

The CPU 11 executes control code stored in the ROM/RAM 12 to execute general control of operations carried out in the HDD 10.

The disk controller 13 receives a command from a host connected to the HDD 10 by an interface 17. It is to be noted that the host itself is not shown in the figure. The CPU 11 processes the command, and the disk controller 13 requests the data read/write control unit 15 and/or the servo control unit 16 to carry out hardware operations in accordance with the command.

Data received from the host through the interface 17 as data to be written onto a magnetic disk 21 and data read out from the magnetic disk 21 to be transferred to the host are stored in the buffer RAM 14 on a temporary basis.

The data read/write control unit 15 carries out an encoding/modulation process on data to be recorded on the magnetic disk 21 in order to create a data pattern to be actually recorded onto the magnetic disk 21 by way of a pre-amplifier 25. Conversely, the data read/write control unit 15 carries out a demodulation process on data read out and received from the magnetic disk 21 through the pre-amplifier 25.

The servo control unit 16 drives a voice coil motor (VCM) 23 and a spindle motor (SPM) 24 synchronously with each other. The VCM 23 is a motor for moving an arm, on which a magnetic head 22 is mounted. The magnetic head 22 is a component for recording and reproducing data onto and from the magnetic disk 21. Thus, the VCM 23 is controlled to move the magnetic head 22 to a domain on a target track of the magnetic disk 21. In addition, control is also executed to carry out a seek operation of moving the magnetic head 22 to a predetermined position on the basis of a servo pattern provided on the magnetic disk 21 as described earlier.

A number of concentric tracks serving as areas for recording data are created on the magnetic disk 21. Typically, sequential track numbers 0, 1, 2 and so on are assigned to the tracks starting with a track on the outermost circumference of the magnetic disk 21 in a direction toward the innermost circumference. Each of the tracks is further divided into sectors. Data is written onto and read out from the magnetic disk 21 in sector units, which are minimum units for the read and write operations.

Data amount in a sector has a fixed amount of typically 512 bytes. In addition to data recorded in a sector, the sector actually includes additional information such as information on the header and an error correction code.

The number of sectors per track is changed from circumference to circumference in accordance with a ZBR (Zone Bit Recording) method. To put it in detail, the longer the circumference on which a track lies, that is, the more outer the location of the track, the larger the number of sectors on the track. That is to say, the number of sectors per track is not uniform throughout all circumferences on the magnetic disk 21. Instead, the recording face of the magnetic disk 21 is divided into a plurality of zones arranged in the radial direction, and the number of sectors is made uniform for all the zones.

It is to be noted that a drive unit can have a configuration in which a plurality of magnetic disks (magnetic plates) is piled up to form a stack with the centers of the magnetic disks aligned along a straight line. In this configuration shown in none of the figures, tracks each created on one of the magnetic disks as tracks having the same track number can be considered as tracks forming the wall of a cylinder, which is identified by using the same cylinder number as the track number assigned to the tracks.

FIG. 2 is a diagram showing a typical ZBR method.

According to the typical ZBR method shown in the figure, the disk is divided into 3 zones, i.e., zones 0, 1 and 2 arranged in an order starting from the outermost circumference of the magnetic disk 21 where the numbers 0, 1 and 2 are zone numbers assigned sequentially to the zones. Each of the zones includes a plurality of tracks.

For example, zones 0, 1 and 2 comprise 32, 16 and 8 sectors respectively. Since the revolution speed of the spindle motor 24 is constant, the number of zones accessed per disk rotation varies from zone to zone. By also varying the frequency of a recording/reproduction clock signal in dependence on the zone, however, the line recording density can be confined within a predetermined range and the recording capacity per disk can be increased.

In the HDD 10 provided by the embodiment, the magnetic head 22 makes an access to data of the amount equivalent to 1 track starting from an on-tracked sector.

Instead of assigning a fixed sector number to each sector on the same track, a sector number dependent on the relative position of a sector can be assigned to the sector. In this way, an access can be started from any sector on a track. That is to say, by using a track as an access unit, it is possible to get rid of a process entailing an indeterminate element such as a pre-fetch operation and to determine the timing to activate a seek operation with a high degree of certainty. In addition, if an access can be started from any sector on a track, a rotation wait is no longer required. Thus, the number of seek operations can be reduced to a minimum and the access time can hence be shortened.

In an operation to write data onto a predetermined track, information on a position relative to a sector, from which the write access is started, is assigned to each sector on the track.

In an operation to read out data from a predetermined track, on the other hand, the operation is started from a sector, from which the read access is started, and the data is stored in the buffer RAM 14 on the basis of relative-position sector numbers. Thus, the operation to read out data can be started from any sector.

By designing the format of the magnetic disk 21 into a configuration like the one described above, the HDD 10 can function without a rotation wait. As a result, it is possible to reduce the time to make an access to a desired sector on the disk.

Figure 3:
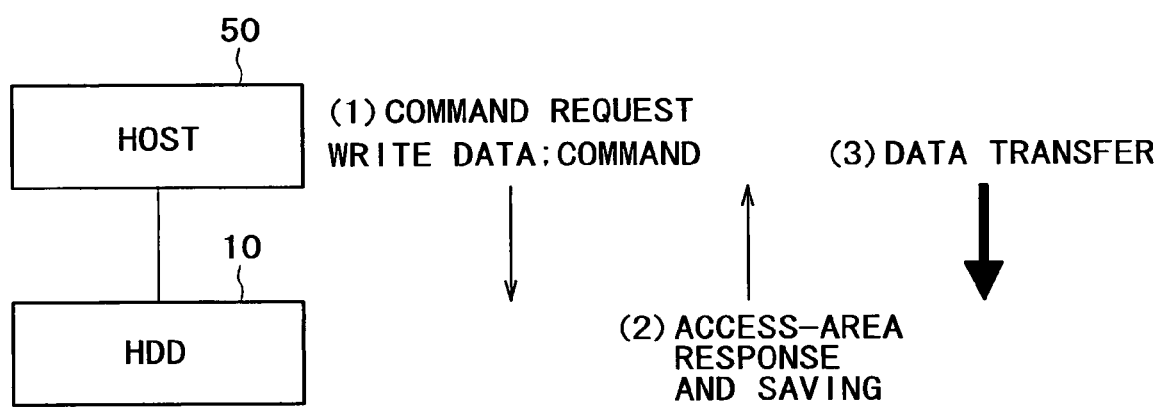
FIG. 3 is a diagram showing typical communications, which take place when the HDD 10 implemented by the embodiment writes data onto a disk in accordance with a command received from a host 50 connected to the HDD 10 by an interface 17.

FIG. 3 is a diagram showing typical communications, which take place when the HDD 10 implemented by the embodiment writes data onto a disk in accordance with a command received from the host 50 connected to the HDD 10 by the interface 17.

First of all, the host 50 issues a command to write data to the HDD 10. In response to the command, the HDD 10 transmits information on an address area to the host 50. The address area also indicates a minimum time of a seek operation starting from the present access sequence.

Receiving the response from the HDD 10, the host 50 transmits data of a content with a quantity corresponding to the size of the address area specified in the response to the HDD 10. In general, the size of an address area is expressed in terms of bytes, sectors or the like. Then, the HDD 10 writes the data of the content onto the magnetic disk 21 in track units.

As described above, at the time of an access to write data into a track, pieces of relative-position information are sequentially assigned to sectors on the track, starting with a sector from which the access to the track is started. Thus, the host 50 does not need in particular to be aware of a concrete write location, which is usually expressed in terms of a cylinder number, a head number, a sector number and the like and, hence, does not specially need to specify such a concrete write location in the command.

In addition, the address-area, which the host 50 is informed of, can be simple. An example of the simple information on an address area is a content number assigned to a content to be written onto the magnetic disk 21 as requested by the command issued by the host 50. The HDD 10 prepares a conversion table in advance. The conversion table shows a relation between content numbers and physical storage locations on the magnetic disk 21. Since a disk access is made in track units in this embodiment, the conversion table showing a relation between content numbers and physical storage locations on the magnetic disk 21 can be typically one shown as follows:

TABLE 1

| Content number | Track numbers | Head number |
| --- | --- | --- |
| 1 | 0 to 99 | 0 |
| 2 | 100 to 129 | 0 |
| 3 | 200 to 249 | 0 |
| 4 | 130 to 199 | 0 |
| 5 | 300 to 399 | 0 |
| . | . | . |
| . | . | . |
| . | . | . |
| 9 | 470 to 499 | 0 |
| Unused | — | — |
| Unused | — | — |
| Unused | — | — |
| . | . | . |
| . | . | . |
| . | . | . |
| Unused | 500 to 999 | 0 |
| Unused | 0 to 999 | 1 |

Be aware of the fact that the conversion table does not include sector numbers according to the CHS method. In a configuration wherein, at the time to make an access to write data into a track, pieces of relative-position information are sequentially assigned to sectors on the track, starting with a sector from which the write access to the track is commenced as described above and, at a time to make an access to read out the data from the track, the data can be relocated on the basis of the information on the relative positions of the sectors without regard to the sector included in the track as a sector to start the read access. Thus, it is not necessary to specify an access-start sector in the conversion table.

The conversion table is stored in the buffer RAM 14. The disk controller 13 or the CPU 11 writes information into the conversion table by execution of software at a point of time data to be written onto the magnetic disk 21 is received from the host 50.

Figure 4:
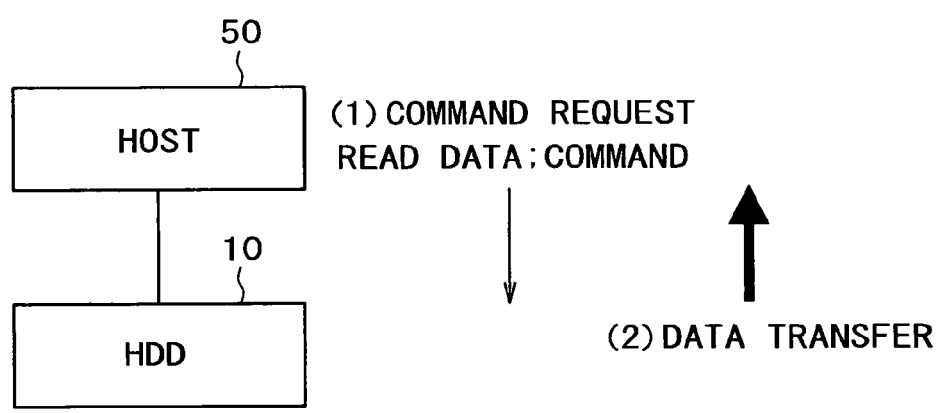
FIG. 4 is a diagram showing typical communications, which take place when the HDD 10 implemented by the embodiment reads out data from the disk in accordance with a command received from the host 50 connected to the HDD 10 by the interface 17.

FIG. 4 is a diagram showing typical communications, which take place when the HDD 10 implemented by the embodiment reads out data from the magnetic disk 21 in accordance with a command received from the host 50 connected to the HDD 10 by the interface 17.

First of all, the host 50 issues a command to read out data from the magnetic disk 21 to the HDD 10. The command specifies the number of a content to be read out.

In accordance with the command, the HDD 10 identifies target tracks from the conversion table based on the number of the content to be read out, and carries out a seek operation moving the magnetic head 22(see the table 1). Then, data is transferred from the magnetic disk 21 in accordance with an address-area sequence generated as a response to a write command in an operation to write the data on to the target tracks.

Thus, in a request for an operation to read out data from the magnetic disk 21, the host 50 needs to specify only the number of a desired content. That is to say, the host 50 does not have to be aware of a concrete write location (PBA) of the content. Generally, the PBA includes the number of a cylinder, the number of a head and the number of a sector.

As described above, in the HDD 10 provided by the embodiment, the magnetic head 22 makes an access to data of the amount equivalent to 1 track starting from an on-tracked sector. By using a track as an access unit, it is possible to get rid of a process entailing an indeterminate element such as a pre-fetch operation and to determine the timing to activate a seek operation with a high degree of certainty. In addition, an access to a track can be made by starting the access from any sector on the track. That is to say, a read or write operation can be started from any head location, at which the magnetic head 22 is positioned right after a seek operation, without incurring a rotation wait. As a result, the number of seek operations can be reduced to a minimum and the access time can be shortened.

In order to perform such disk access operations, the disk controller 13 requests the data read/write control unit 15 and/or the servo control unit 16 to carry out hardware operations in accordance with a result of processing a command by the CPU 11.

Figure 5:
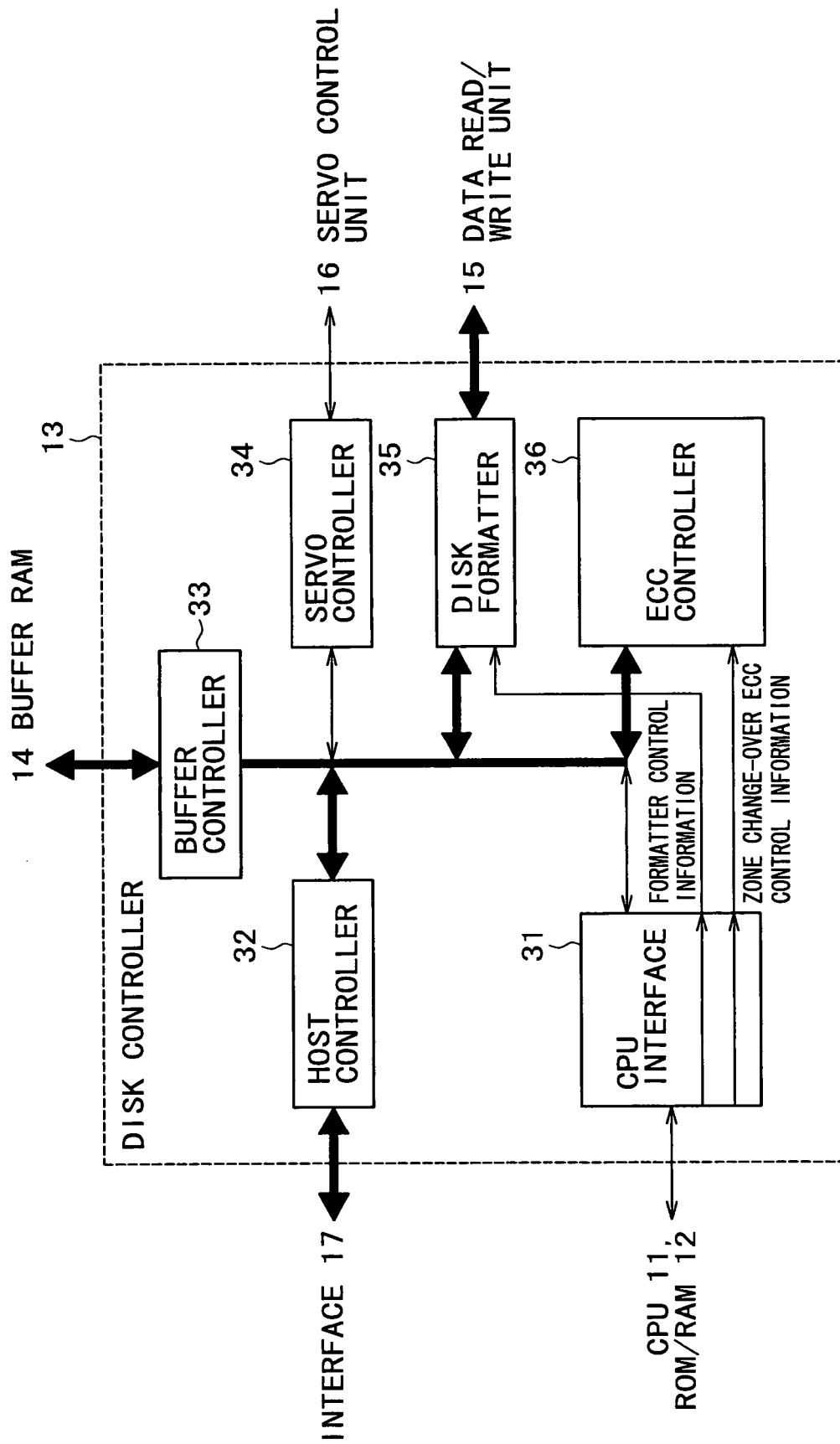
FIG. 5 is a diagram showing the internal configuration of a disk controller 13 in detail.

FIG. 5 is a diagram showing details of the internal configuration of the disk controller 13 employed the HDD 10 shown in FIG. 1.

As shown in the figure, the disk controller 13 comprises a CPU interface 31, a host controller 32, a buffer controller 33, a servo controller 34, a disk formatter 35 and an ECC controller 36. It is to be noted that, in the figure, each double-line arrow represents a flow of data.

The CPU interface 31 is an interface with the CPU 11 and the ROM/RAM 12. The CPU interface 31 informs the CPU 11 that a command has been received from the host and waits for the CPU 11 to output a result of processing the command.

The host controller 32 is a component for carrying out communications with the host through the interface 17.

The buffer controller 33 a component for controlling exchanges of data with the buffer RAM 14 and the disk controller 13.

The servo controller 34 fetches servo information from a servo pattern on the magnetic disk 21 by controlling operations of the VCM (Voice Coil Motor) 23 and the SPM (Spindle Motor) 24 and supplies the servo information to the servo control unit 16.

The disk formatter 35 is a component for executing control for writing data from the buffer RAM 14 onto the magnetic disk 21 and reading out data from the magnetic disk 21.

The ECC controller 36 generates an ECC code from data stored in the buffer RAM 14, adding the ECC code to the data in a write operation and correcting an error contained in data stored in the buffer RAM 14 in a read operation.

By designing the HDD 10 implemented by the embodiment into the configuration described above, it is possible to execute data access control requiring no rotation wait. It is thus possible to construct a system having a high data transfer speed.

By the way, in most of the conventional HDD systems, error correction is carried out only for each sector unit, which comprises 512-byte data and information bits. That is to say, even though a random error generated in each sector can be corrected, the conventional HDD systems have a problem that it is not possible to correct a random error beyond a range of correctable errors and burst errors or a long sequence of errors crossing a boundary between adjacent sectors.

In such a case, typically, error correction can be carried out by performing a retry operation in order to reduce the number of errors to a value not exceeding a predetermined limit. However, each retry operation basically increases the access time by extra time it takes to make another access to data with an amount equivalent to 1 track. In the end, when a retry operation is carried out, the access time increases, reducing the effect of the effort to shorten the access time by adoption of the technique to access data in track units as described above. As a result, an operation to read out data from the magnetic disk 21 incurs a delay time.

In a process to handle an AV content such as a process to reproduce HD (high definition) data or a special reproduction process, a high transfer speed is required. In this case, there may be no time margin to carry out a retry operation even if an uncorrectable read error is generated. In such a case, with the contemporary technology, the process is continued without correcting the read error. As a result, the quality of the reproduced picture unavoidably deteriorates.

In order to solve the above problem, the ECC configuration in this embodiment is contrived as follows. In order to reproduce data in a stable manner, an effort is made to reduce the number of cases in which an error cannot be corrected, requiring that a retry operation be carried out.

To put it in detail, this embodiment adopts a C2 correction technique capable of correcting an inter-sector error in addition to the conventional C1 correction technique of correcting errors for each sector. In addition, there is devised a configuration in which a track is used an error correction unit (or an ECC block) allowing the C1 and C2 correction techniques to be adopted. That is to say, the ECC block unit uses 1 track as its base. In other words, there is no case in which 2 ECC block units exist in a track.

Since an ECC block unit comprising C1 and C2 is completely formed as 1 track circle, it is possible to take 1 track as an access unit and implement data access control requiring no rotation wait. That is to say, it is possible to shorten the time of an access to a location for storing desired data. In addition, since there is no case in which 2 ECC block units exist in a track, it is also possible to implement data access control requiring no rotation wait as well even if the ECC configuration comprises a plurality of track units.

It is to be noted that Japanese Patent Laid-open No. 2000-08988, Japanese Patent Laid-open No. 2000-293944 and Japanese Patent Laid-open No. 2000-278645 describe configurations of adding c1 parity and c2 parity in addition to c1 parity in dependence on the type of data. It is worth noting that Japanese Patent Laid-open No. 2000-08988 corresponds to a U.S. patent application Ser. No. 09/384,613 filed on Aug. 27, 1999, which is now U.S. Pat. No. 6,694,092. The present invention has an aspect in which the prior art technologies are developed from the standpoint of assuring the high transfer speed. This specification incorporates the contents of Japanese Patent Laid-open No. 2000-08988, its corresponding U.S. Pat. No. 6,694,092, Japanese Patent Laid-open No. 2000-293944 and Japanese Patent Laid-open No. 2000-278645.

The following description explains operations carried out in the disk controller 13 when the error correction processing cited above is performed.

First of all, the disk controller 13 receives formatter control information and zone changeover ECC control information from the CPU 11.

The formatter control information is information on a disk format, which is used for commencing an access from a start sector and accessing data of an amount equivalent to 1 track after the data on a track found in a seek operation becomes accessible. The formatter control information is supplied to the disk formatter 35 by way of the CPU interface 31. At this point, data formatter is generated.

On the other hand, the zone changeover ECC control information is information for setting an ECC configuration, which is completely formed as a track unit. This is because, when the zone is changed from one to another, the number of sectors per track also changes as well so that the setting of the ECC configuration needs to be changed. The zone changeover ECC control information is supplied to the ECC controller 36 by way of the CPU interface 31. The ECC controller 36 then sets the ECC configuration and carries out a predetermined ECC process by making accesses to the buffer RAM 14.

Figure 6:
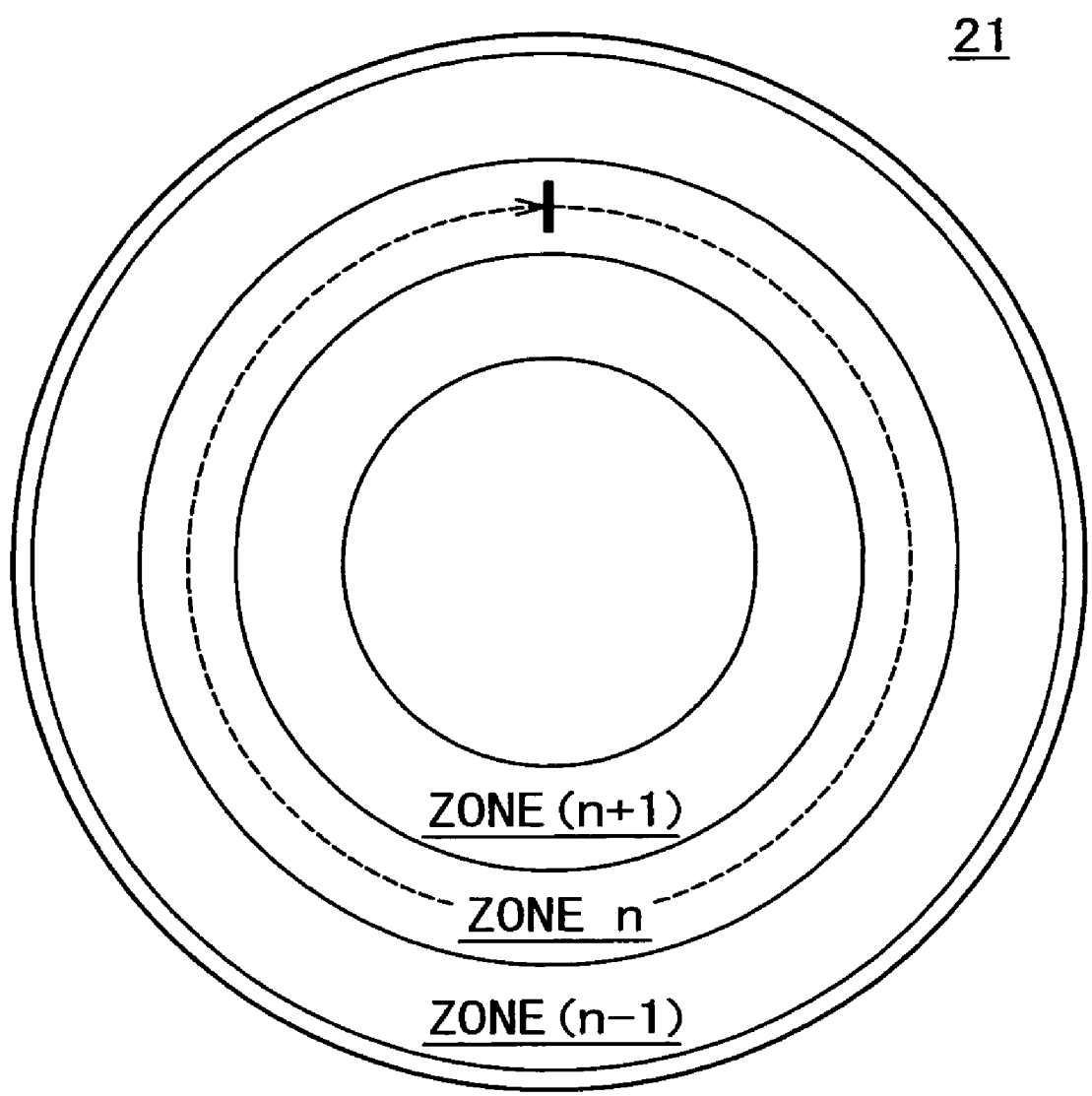
FIG. 6 is a diagram showing a typical configuration of an ECC block provided by the embodiment.

FIG. 6 is a diagram showing a typical configuration of the ECC block provided by the embodiment. On the magnetic disk 21, there are created ECC blocks each taking 1 track as its basic unit. In the typical configuration shown in the figure, the magnetic disk 21 is divided into zones. The figure shows ECC blocks in zone n. 1 circle of a predetermined track in zone n is used as a configuration unit of an ECC block. An ECC block includes C1 codes for correcting errors in each sector and C2 codes for correcting inter-sector errors.

Figure 7:
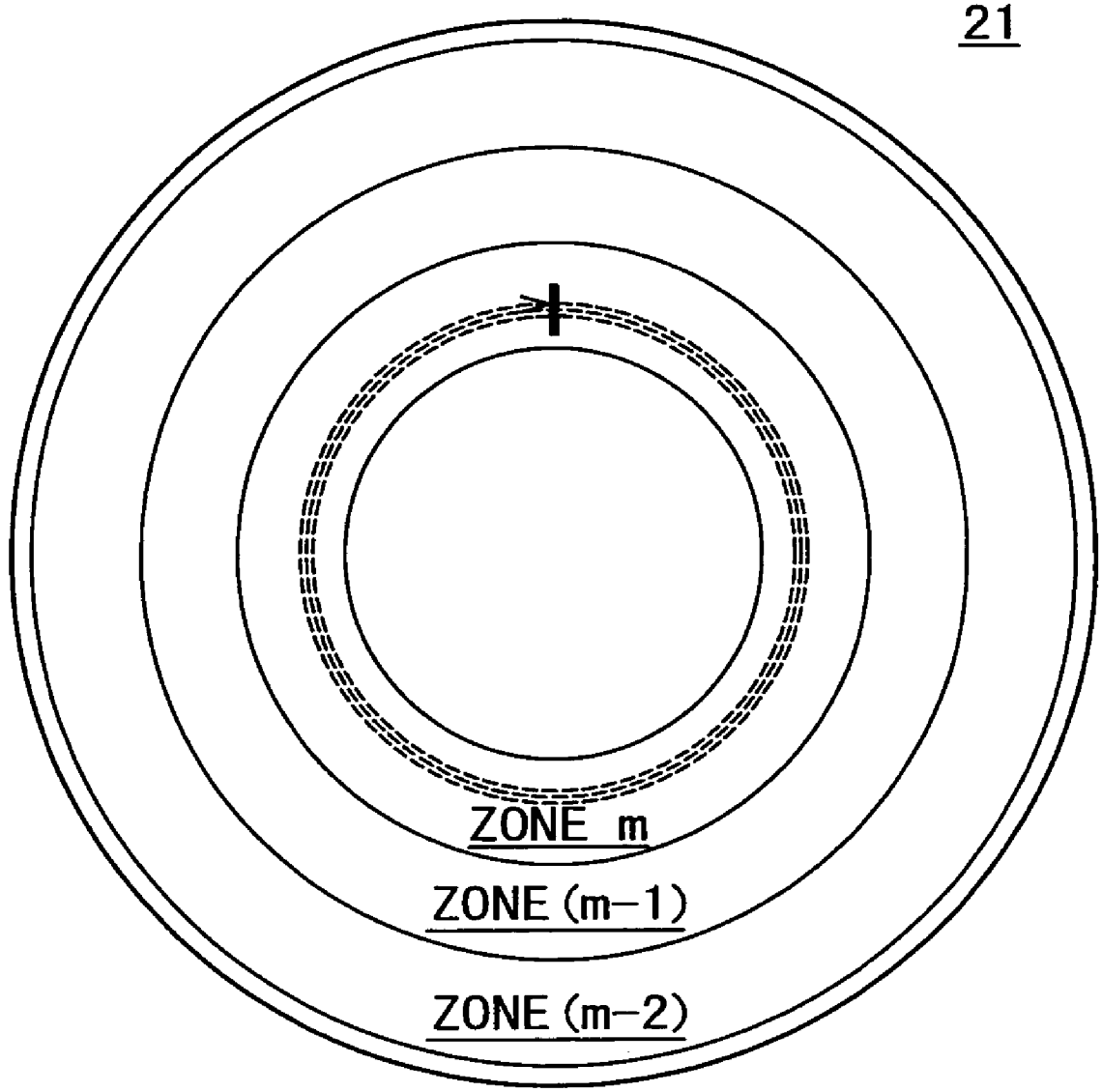
FIG. 7 is a diagram showing another typical configuration of the ECC block provided by the embodiment.

FIG. 7 is a diagram showing another typical configuration of the ECC block provided by the embodiment. In the typical configuration shown in the figure, the magnetic disk 21 is divided into zones. The figure shows ECC blocks in zone m. The typical configuration shown in the figure is different from the typical configuration shown in FIG. 6 in that, in the case of the typical configuration shown in FIG. 7, 3 track circles in zone m are used as a configuration unit of an ECC block. An ECC block includes C1 codes for correcting errors in each sector and C2 codes for correcting inter-sector errors.

In either the typical configuration shown in FIG. 6 or 7, the ECC block used as an error correction unit including C1 and C2 codes has 1 track as a basic unit and there is no case in which 2 ECC block units exist in any track.

Figure 8:
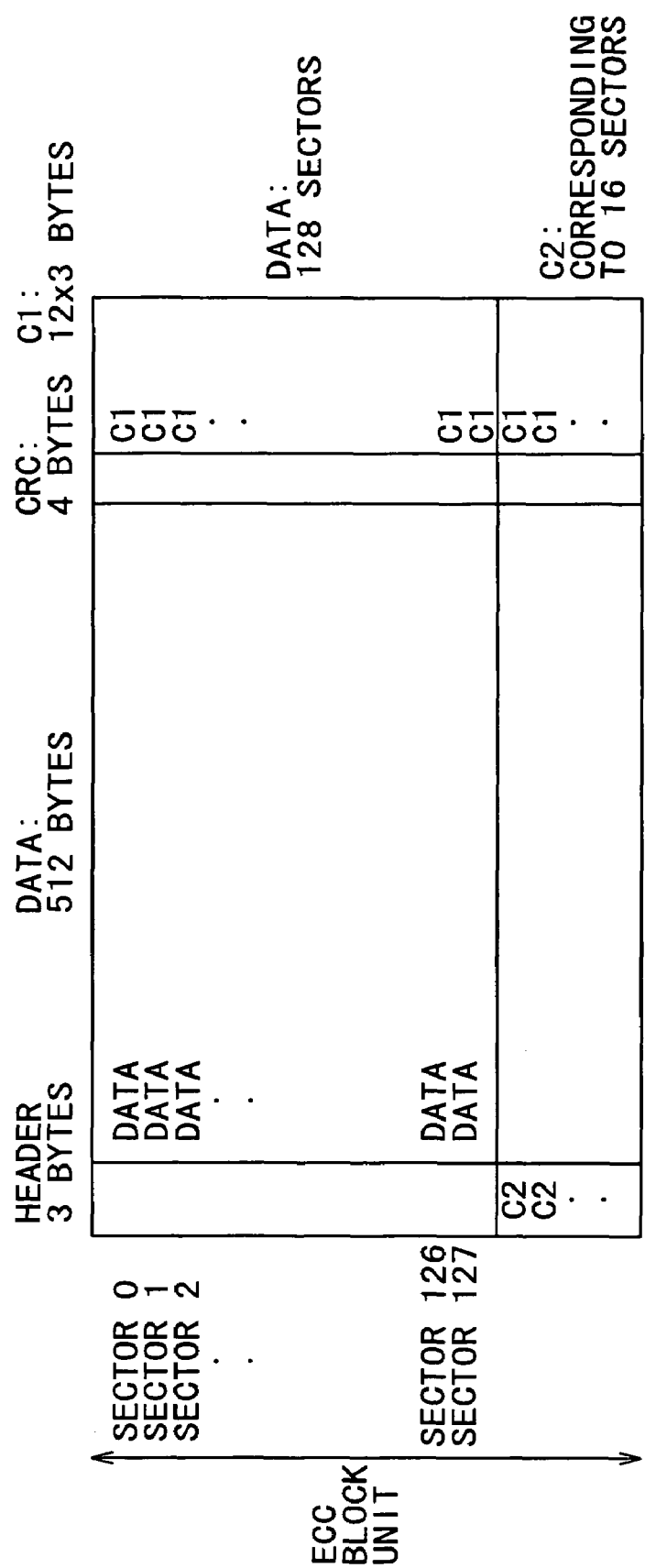
FIG. 8 is a diagram showing a model of a typical disk format structure of a magnetic disk 21 using the ECC blocks shown in FIGS. 6 and 7.

FIG. 8 is a diagram showing a model of a typical disk format structure of the magnetic disk 21 using the ECC blocks shown in FIGS. 6 and 7. As an ECC correction code, however, the Reed-Solomon code with a symbol length of 8 is used. In the following description, it is also assumed that the Reed-Solomon code with a symbol length of 8 is used as an ECC correction code.

Assume that the number of valid sectors per track circle in a zone of a certain magnetic disk is 144. A sector comprises a header with a length of 3 bytes, data with a size of 512 bytes, a 4-byte CRC (Cross Check Code) and an additional C1 code consisting of 36 bytes, being composed of 3 interleaves.

In the typical model shown in FIG. 8, 128 sectors ranging from sector 0 to sector 127 are allocated as a data area and 16 sectors ranging from sector 128 to sector 143 are allocated as a C2 area.

In such a configuration, 1 ECC block thus comprises a total of 144 sectors and occupies a track circle in this zone, hence, implementing a track unit.

The ability of error correction in this typical model is studied as follows. By using the C1 code to correct a random error, correction of 18 bytes per sector is possible. If byte disappearance information is obtained, correction of 36 bytes is possible. In addition, by using the C2 code to correct burst errors, error correction for a length of up to 8 sectors is possible. By using a CRC result, error correction for a length of up to 16 sectors is possible.

It is to be noted that interleaves are not described in the typical model shown in FIG. 8. In the case of the Reed-Solomon code with a symbol length of 8, however, it is necessary to apply an interleave to data having a size of 512 bytes as will be described later.

Figure 9:
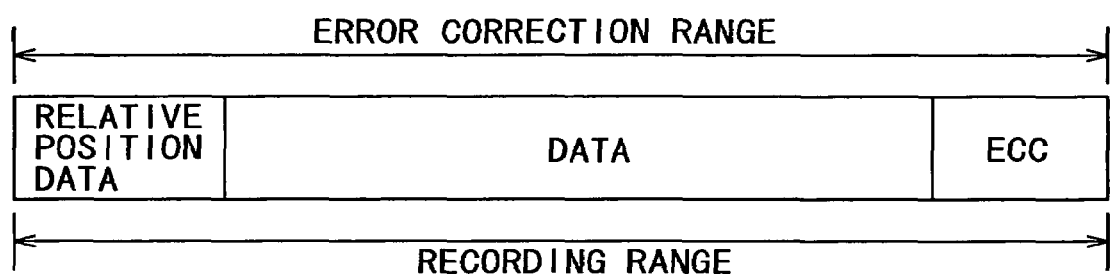
FIG. 9 is a diagram showing a model of a typical format of each sector existing on a track of the magnetic disk 21 in the HDD 10 implemented by the embodiment.

FIG. 9 is a diagram showing a model of a typical format of each sector existing on a track of the magnetic disk 21.

As shown in the figure, a sector includes relative-position data showing the relative position of the sector, a data main body and an ECC for correcting errors existing in the entire area of the sector. The relative-position data, the data main body and the ECC are handled as an error correction range as well as a recording range.

With the relative-position data included in the error correction range as a header, by carrying out error correction, the relative-position data can be recovered even if the error is a random error generated in the sector. It is thus possible to realize a smooth disk access operation.

In general, a sector has an ID field for recording the address of the sector. By recording information on a relative position instead of an absolute position, however, the size of the ID field can be shrunk. Thus, the size of the field allocated to the data main body in the sector can be raised by the decrease in ID-field size. As a result, the recording area can be utilized with a high degree of efficiency.

In an operation to write data onto a track, pieces of information on relative positions of sectors in the track are assigned to the sectors, starting with a sector from which the write access is commenced. Then, ECC data is generated on the basis of the data to be written onto each sector and the information assigned to the sector as the information on the relative position of the sector.

Finally, for each sector, the information assigned to the sector as the information on the relative position of the sector, the data to be written onto the sector and the ECC data are recorded into respectively the relative-position field, the data field and the ECC field, which are fields of the sector. Since the operation to write data onto the track is carried out, starting from a sector to commence the write access, no rotation wait is required.

In an operation to read out data from a track, on the other hand, the operation to read out data from the track is also carried out, starting from a sector to commence the read access. Then, the data read out from the track is stored in the buffer RAM 14 at storage locations determined on the basis of information obtained from the relative-position fields of the sectors. In this way, even though the operation to read out pieces of data from a track is started from any arbitrary sector of the track, the pieces of data are relocated in the buffer RAM 14 at storage locations determined on the basis of the information on relative positions. Thus, the pieces of data can be restored to their original order in which the pieces of data are recorded on the track. In addition, since the operation to read out data from a track is also carried out, starting from a sector to commence the read access, no rotation wait is required either.

As an alternative, in an operation to read out pieces of data from a track, the operation to read out the pieces of data from the track is also carried out, starting from a sector to commence the read access and all the pieces of data with an amount equivalent to 1 track are stored in the buffer RAM 14 on a temporary basis. Then, an order to read out the pieces of data from the buffer RAM 14 is changed on the basis of information stored in the buffer RAM 14 along with the pieces of data as information on sector positions obtained by the relative position field. In this way, the pieces of data can be restored to their original order in which the pieces of data are recorded on the track.

As another alternative, in an operation to read out pieces of data from a track, starting from a sector to commence the read access and the pieces of data read out from the track are stored in the buffer RAM 14. Information on the relative position assigned to a specific sector to commence the read access is detected from the relative-position field of the specific sector. When such information is detected, the piece of data read out from the specific sector is output directly to an eventual external destination. As the operation to read out pieces of data with an amount equivalent to 1 track from the track is completed, the pieces of data stored in the buffer RAM 14 so far might be output directly to the eventual external destination. In this way, the delay time of an operation to output the data to the eventual external destination can be reduced.

Figure 10:
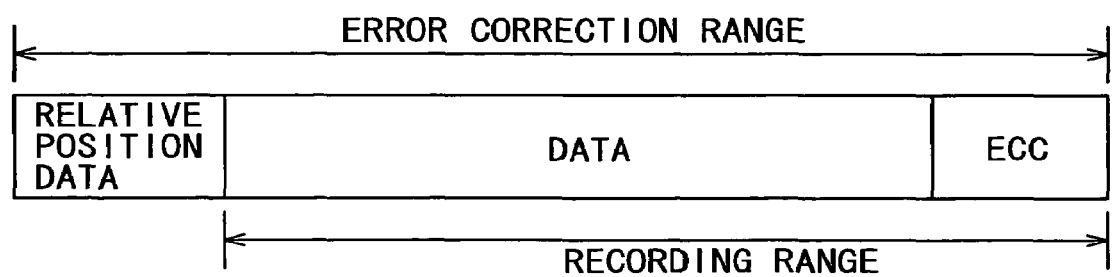
FIG. 10 is a diagram showing a model of another typical sector format.

FIG. 10 is a diagram showing a model of another typical format of each sector existing on a track of the magnetic disk 21 in the HDD 10 implemented by the embodiment.

Much like the typical format described above, a sector includes relative-position data showing the relative position of the sector, a data main body and an ECC for correcting errors existing in the entire area of the sector. The relative-position data, the data main body and the ECC are handled as an error correction range. Unlike the typical format shown in FIG. 9, however, the relative-position field is not included in the recording range. By excluding the relative-position data from the recording range, the size of the field allocated to the data main body in the sector can be further raised by the size of the relative-position field in comparison with the typical format described earlier. As a result, the recording area can be utilized with a high degree of efficiency.

In an operation to write data onto a track, pieces of information on relative positions of sectors in the track are assigned to the sectors, starting with a sector from which the write access is commenced. Then, ECC data is generated on the basis of the data to be written onto each sector and the information assigned to the sector as the information on the relative position of the sector. Finally, for each sector, only the data to be written onto the sector and the ECC data are recorded into respectively the data field and the ECC field, which are fields of the sector. Since the operation to write data onto the track is carried out, starting from a sector to commence the write access, no rotation wait is required.

In an operation to read out data from a track, on the other hand, starting from a sector to commence the read access, and errors in each sector are corrected by using the ECC to regenerate information on the relative position of each sector because this information was not written into each sector. Then, the data read out from the track is stored in the buffer RAM 14 at storage locations determined on the basis of the information on relative positions of the sectors in the track. In this way, even though the operation to read out pieces of data from a track is started from any arbitrary sector of the track, the pieces of data are relocated in the buffer RAM 14 Thus, the pieces of data can be restored to their original order in which the pieces of data are recorded on the track. In addition, since the operation to read out data from a track is also carried out, starting from a sector to commence the read access, no rotation wait is required either.

Figure 11:
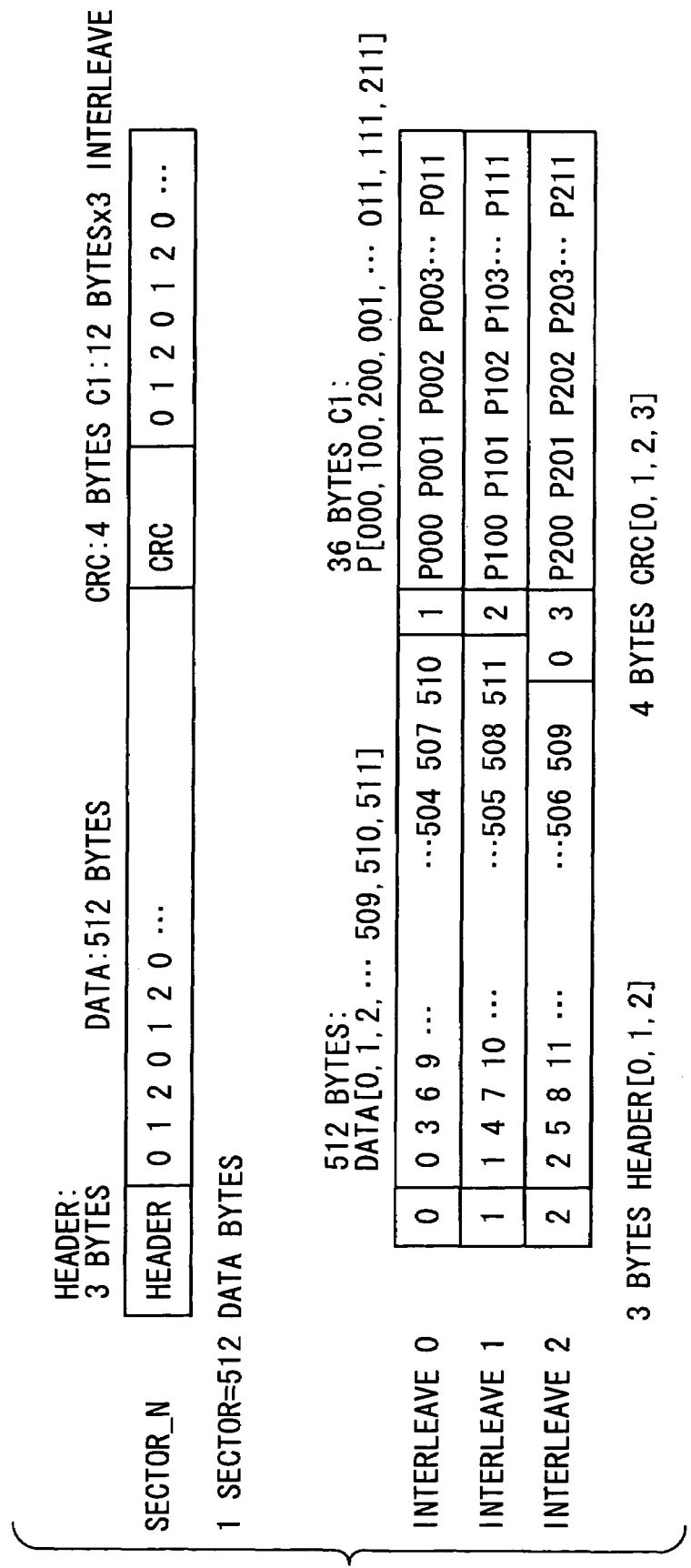
FIG. 11 is a diagram showing a typical application of interleaves to the configuration of the ECC block provided by the embodiment.

FIGS. 11 and 12 are each a diagram showing a typical application of interleaves to the configuration of the ECC block provided by the embodiment.

FIGS. 11 and 12 each show an application of interleaves to sector$_{13}$ n, which comprises a header having a length of 3 bytes, data having a length of 512 bytes, a CRC having a length of 4 bytes. The sector is divided into 3 interleaves each serving as a division unit including an ECC C1-code portion having a length of 12 bytes.

To put it concretely, the header having a length of 3 bytes, the data having a length of 512 bytes, the CRC having a length of 4 bytes. Interleave 0 includes a header having a length of 1 byte, a data field having a length of 171 bytes, a CRC having a length of 1 byte and a parity having a length of 12 bytes. By the same token, interleave 1 includes a header having a length of 1 byte, a data having a length of 171 bytes, a CRC having a length of 1 byte and a parity having a length of 12 bytes. However, interleave 2 includes a header having a length of 1 byte, a data having a length of 170 bytes, a CRC having a length of 2 bytes and a parity having a length of 12 bytes.

Locations in a sector are allocated as follows. Locations 0, 1 and 2 are allocated to interleaves 0, 1 and 2 respectively. Locations 3, 4 and 5 are allocated back to interleaves 0, 1 and 2 and so on. The CRC having a length of 4 bytes is added to the header having a length of 3 bytes and the data having a length of 512 bytes. The C1 code sequentially generated is allocated likewise.

FIG. 11 is a diagram showing distribution of the interleaves. FIG. 12 is a diagram showing allocation of memory addresses 0 to 554 to the bytes of the header, the data, the CRC code and the C1 code.

The header, the data, the CRC code and the C1 code shown in FIG. 11 or 12 form each of the sectors shown in FIG. 8. To put it in detail, the header having a length of 3 bytes, the data having a length of 512 bytes, the CRC having a length of 4 bytes and the ECC C1 code having a length of 36 bytes, which are summed up to give 1 sector, form main elements to be recorded onto a sector of the magnetic disk 21.

It is to be noted that the configuration of actually recorded data further includes additional information such as a preamble, a synchronization signal and a post-amble. Other typical configurations of the sector unit include a format including no header file and a format including no CRC field.

The configuration of interleaves can be determined mainly on the basis of a hardware configuration. In the Reed-Solomon code having a symbol length of 8, an interleave structure is applied in the C1 direction (that is, in the sector direction) as shown, for example, in FIG. 11.

The interleaves described above can be applied to the C2 code used as an inter-sector ECC. In this case, an interleave structure in a track can be obtained by substituting a sector for a byte of the data field shown in FIG. 11 and laying out the sectors in the C2 direction (that is, a direction orthogonal to the sector direction). In this way, it is possible to realize a track interleave structure similar to a sector interleave structure and the same effects.

As described above, by completely forming an ECC block as a track unit, it is possible to execute data access control requiring no rotation wait. In addition, by adopting the (C1+C2) configuration as an ECC block and further adopting an interleave structure as the ECC block, it becomes possible to correct random errors of a broader range and burst errors. As a result, it is possible to construct a stable system capable of preventing a data transfer speed from decreasing due to retry operations.

In this embodiment, a sector comprises 512 bytes. It is to be noted, however, that the number of bytes composing a sector is not limited to 512. For example, a sector may also be used for recording data having a length of 1,024 or 2,048 bytes. Also in the case of such sector lengths, it is possible to realize an ECC block for each sector or an inter-sector ECC block in the same way as described above.

By the way, with an ECC block completely formed as a track unit, in a changeover of the zone on the magnetic disk 21 from one to another, the number of sectors per track also changes as well. Thus, in a configuration with a uniform ECC parity bit count, it is quite within the bounds of probability that the ability of error correction also greatly changes from zone to zone.

In order to solve the above problem, the configuration of the ECC block can also be made variable from zone to zone as long as the redundancy of the error correction code is confined within a predetermined range. As a result, the ability of error correction can be implemented with a strength made uniform throughout all circumferences of the magnetic disk 21.

FIG. 13 is a diagram showing a model of a disk format for an ECC block changed from zone to zone.

As shown in the figure, the recording face of the magnetic disk 21 is divided into zones, which have sector counts different from each other. To put it concretely, zone 0, 1 and 2 have 32, 16 and 8 sectors respectively. The rotating speed is uniform for all the zones. By changing the operating clock frequency from zone to zone, however, the line recording density can be confined in a predetermined range for all the zones.

In this case, a C1 code is added to each sector as an ECC. The configuration of the C1 code is fixed and uniform for all sectors. To put it concretely, the configuration shown in FIG. 11 or 12 is taken as the configuration of the C1 code.

As for the configuration of the C2 code, as shown in the figure, zones 0, 1 and 2 include 4, 2 and 1 sectors respectively as C2 parity.

In the configuration wherein C2-parity sectors are included in each of the zones in this way, the ratio of the number of C2-parity sectors provided in a zone to the number of data sectors included in the circle of the zone is constant so that the C2 correction power can be made uniform for all the zones.

It is to be noted that, in an actual format, there are only few cases in which the ratio of the number of C2-parity sectors provided in a zone to the number of data sectors included in the circle of the zone is uniform for all the zones as is the case shown in FIG. 13. Thus, in many cases, an extra C2-parity sector can be added to a zone as a redundant C2-parity sector as long as the redundancy of the ECC portion is confined within a predetermined range.

Take a zone configuration shown in table 2 as an example. In this case, the following numbers are obtained. In the zone configuration shown in the table, the number of zones is 6. The C1 configuration is set at a fixed format like the one shown in FIG. 11. On the other hand, the C2 configuration is made variable from zone to zone. The ratio of the number of C2-parity sectors and the total number of data sectors included in the zone also changes from zone to zone. In addition, each of the zones is divided into a plurality of interleaves each having a size not exceeding 128 sectors. C2-parity sectors added to each of the zones include extra sectors used as redundant C2-parity sectors, but the C2 redundancy for the zone is confined within the predetermined range 10% to 11%.

TABLE 2

|        | Valid sectors | C2 configuration |
|--------|---------------|------------------|
| Zone 0 | 360 sectors   | (108 data sectors + 12_C2 sectors) × 3 interleaves |
| Zone 1 | 330 sectors   | (98 data sectors + 12_C2 sectors) × 3 interleaves |
| Zone 2 | 300 sectors   | (90 data sectors + 10_C2 sectors) × 3 interleaves |
| Zone 3 | 280 sectors   | (84 data sectors + 10_C2 sectors) × 3 interleaves |
| Zone 4 | 252 sectors   | (112 data sectors + 14_C2 sectors) × 2 interleaves |
| Zone 5 | 224 sectors   | (100 data sectors + 12_C2 sectors) × 2 interleaves |

As described above, by completely forming an ECC block as a track unit, adopting the (C1+C2) configuration and also adopting an interleave structure and making the ECC configuration variable from zone to zone with the redundancy of the ECC portion controlled to values within a predetermined range for each zone, it becomes possible to correct random errors of a broader range and burst errors throughout the entire magnetic disk 21 and implement stable data reproduction.

In the embodiment described above, the C1 portion of the ECC configuration is fixed while the C2 portion of the ECC configuration is made variable but the redundancy of the ECC portion is confined within predetermined limits so that the ability of error correction can be controlled to values within a predetermined range. It is to be noted, however, that the scope of the present invention is not limited to this embodiment. For example, the C2 portion can be fixed while the C1 portion can be made variable so that the ability of error correction is controlled to values within a predetermined range. As another alternative, both the C1 and C2 portions are controlled in a coordinated manner to adjust the ability of error correction to values within a predetermined range.

FIG. 14 is a diagram showing another embodiment for a variable configuration of the ECC block. To be more specific, FIG. 14 shows an embodiment in which the configuration of the ECC block varies from zone to zone as shown in FIG. 13 and a zone has an ECC block configuration not completely formed as one track unit.

As shown in the figure, the recording face of the magnetic disk 21 is divided into zones, which have sector counts different from each other. To put it concretely, zone 0, 1 and 2 have 32, 16 and 8 sectors respectively. The rotating speed is uniform for all the zones. By changing the operating clock frequency from zone to zone, however, the line recording density can be confined in a predetermined range for all the zones.

In this case, a C1 code is added to each sector as an ECC. As for the configuration of the C2 code, as shown in the figure, zones 0 and 1 include 2 and 1 sectors respectively. However, zone 2 includes no C2 sector.

In the configuration formed as such, the ratio of the number of C2 sectors provided in a zone to the number of data sectors included in the circle of the zone is constant for zones 0 and 1 so that the C2 correction power can be made uniform for zones 0 and 1. However, zone 2 has a configuration including only a C1 code.

Thus, in this embodiment, the actual error correction based on C1+C2 codes or based on the C1 code only is carried out for a zone selected in dependence on whether the zone is zone 0 or 1 or zone 2.

Typically, zone 0 or 1 is used for recording data, which has a size sufficiently large in comparison with the size of a track and requires a transfer speed at least equal to a predetermined value. An example of such data is an AV content. On the other hand, zone 2 is used for recording other data not requiring a high transfer speed in a strict manner. Examples of this other data are header information and an ordinary computer file.

By applying different formats to different kinds of data to be recorded as described above, read and write operations can be carried out with a high degree of efficiency.

FIG. 15 shows a flowchart representing processing operations carried out in the disk controller 13 in a process to write data onto the magnetic disk 21.

The flowchart begins with a step S1 at which a track is set as a target track. Then, at the next step S2, a seek operation is carried out. Subsequently, at the next step S3, a zone is determined from a target-track value. Then, at the next step S4, information on the zone is transmitted to components employed in the disk controller 13.

For example, the disk formatter 35 sets format information such as a write clock frequency determined in accordance with the zone to be accessed and sectors for the zone. On the other hand, the ECC controller 36 sets ECC information such as a parity count determined in accordance with the zone to be accessed and a variety of set values related to the C1 and C2 codes.

After these pieces of information have been set, an ECC generation process is carried out at the next step S5. To put it in detail, data to be written onto the magnetic disk 21 is received the buffer RAM 14, and the ECC controller 36 carries out an ECC process to add C1 and C2 codes to the data. In the process, the C2 code is generated first to be followed by generation of the C1 code. Then, the disk formatter 35 changes the format of the data into a predetermined format before supplying the data to the data read/write control unit 15.

Then, at the next step S6, the data is actually written onto the magnetic disk 21 upon completion of the seek operation.

FIG. 16 shows a flowchart representing processing operations carried out in the disk controller 13 in a process to read out data from the magnetic disk 21.

The flowchart begins with a step S11 at which a track is set as a target track. Then, at the next step S12, a seek operation is carried out.

Subsequently, at the next step S13, a zone is determined from a target-track value. Then, at the next step S14, information on the zone is transmitted to components employed in the disk controller 13.

For example, the disk formatter 35 sets format information such as a write clock frequency determined in accordance with the zone to be accessed and sectors for the zone. On the other hand, the ECC controller 36 sets ECC information such as a parity count determined in accordance with the zone to be accessed and a variety of set values related to the C1 and C2 codes.

After these setting operations and the seek operation are completed, a process to read out data from the magnetic disk 21 is carried out at the next step S15.

Then, the data including ECCs is supplied to internal components of the disk controller 13 by way of the data read/write control unit 15. The read out data is supplied to the buffer RAM 14 by way of the disk formatter 35. The data of an amount at least equal to the ECC configuration unit is stored in the buffer RAM 14. Then, at the next step S16, the ECC controller 36 carries out an ECC correction process on the data stored in the buffer RAM 14 on the basis of an ECC configuration determined for each zone.

The ECC correction process includes an ECC decoding process based on a C1 ECC code for each sector and an ECC decoding process based on an inter-sector C2 ECC code. Basically, the ECC decoding process based on a C1 ECC code is carried out before the ECC decoding process based on an inter-sector C2 ECC code. If no error is detected in the ECC decoding process based on a C1 ECC code, the ECC decoding process based on an inter-sector C2 ECC code is carried out. In addition, if disappearance position information indicating the position of an error is obtained, disappearance correction is also carried out during the ECC decoding process based on a C1 ECC code and the ECC decoding process based on an inter-sector C2 ECC code by using the disappearance position information.

As an alternative, an ECC decoding process based on both C1 and C2 ECC codes or an ECC decoding process based on a C1 ECC code only is selected typically for each zone or each system.

A result of the ECC correction process is reflected in the buffer RAM 14. Then, with a predetermined timing, the read out data is output to the interface 17 by way of the disk controller 13.

Details of the present invention have been explained in detail by referring to preferred embodiments. It is obvious, however, that people skilled in the art are capable of making changes to the embodiments and/or substituting replacements for elements of the embodiments without departing from the domain of essentials of the present invention. That is to say, the embodiments merely disclose the present invention are thus not to be interpreted as limitations to contents described in this specification. The scope of the present invention is determined only by claims appended at the end of this specification.

In the embodiments described above, as an example, there is adopted a configuration in which pieces of information on positions relative to a start sector are assigned to sectors on a track specified at a write time. However, the scope of the present invention is not limited to the embodiments. For example, the present invention can also be applied to a configuration in which, as a start sector of a track specified at a write time, it is possible to use a sector included in the specified track as a sector passing through a location beneath the magnetic head after an on-track event, that is a first sector located beneath the magnetic head right after completion of the servo control. In this configuration, it is not necessary to assign pieces of information on positions relative to a start sector to sectors on a track specified at a write time. Thus, the ECC for the present invention can be generated without regard to the information on relative positions. For example, it is possible to generate an ECC associated with a logical address (ID) or physical address (ID) of the sector in place of the relative-position information assigned to the sector. It is to be noted that, as the configuration in which a first sector located right after completion of the servo control is taken as a start sector, it is also possible to adopt a configuration wherein a driving apparatus further finds the ID by using a table showing a relation between the distance between 2 tracks on the recording medium and a skew generated in a seek operation between the 2 tracks. Then, the driving apparatus supplies the ID to the host apparatus. In this case, the present invention can be applied to a configuration using a physical ID, a logical ID or a relative ID.

INDUSTRIAL APPLICABILITY

As described above, in accordance with an aspect of the present invention, it is possible to provide an excellent data-recording/reproduction apparatus capable of reproducing data in a stable manner without lowering a transfer speed as well as provide an excellent data-recording/reproduction method to be adopted by the apparatus and a computer program implementing the method.

In accordance with another aspect of the present invention, it is possible to provide an excellent data-recording/reproduction apparatus capable of correcting random and burst errors of a wider range and capable of reproducing data in a stable manner without lowering a transfer speed by elimination of retry operations as well as provide an excellent data-recording/reproduction method to be adopted by the apparatus and a computer program implementing the method.

In accordance with the data-recording/reproduction apparatus or the data-recording/reproduction method, which are provided by the present invention, by using a first error correction unit, it is possible to correct a random error generated in a sector and, by using a second error correction unit, it is possible to correct an error beyond an error correction range in a sector and burst errors crossing a boundary between adjacent sectors. That is to say, by taking (C1+C2) as the configuration of an error correction block, an error can be corrected by using a C2 code when the error cannot be corrected by using a C1 code even in a state wherein a retry operation cannot be carried out due to a need to sustain the data transfer speed at least at a desired value. Thus, a stable system can be provided.

In addition, by providing a configuration in which 2 or more error correction blocks never exist in a track and a complete error correction block is formed as one track unit or a plurality of track units, one track can be used as an access unit and control of data accesses can thus be implemented without requiring a rotation wait. That is to say, it is possible to shorten the time to make an access to a desired data storage location. In addition, since 2 or more error correction blocks never exist in a track, control of data accesses can also be implemented without requiring a rotation wait as well even if the configuration of the error correction code comprises a plurality of track units.

In addition, by making the configuration of the error correction block variable in dependence on a zone in a predetermined disk delimiter, the ability of error correction can be made uniform for all circumferences of the disk and an efficient disk format can be created.

In addition, by adopting an interleave structure in the configuration of an ECC block, it is possible to implement a stable system taking a hardware configuration into consideration.

The invention claimed is:

1. A data-recording/reproduction apparatus for recording data onto a disk-shaped recording medium including concentric recording tracks, each track divided into sectors by splitting said data into predetermined quantities to be recorded onto one of said sectors, each sector used as a minimum access unit, and for reproducing said data from said disk-shaped recording medium, said data-recording/reproduction apparatus comprising:

recording/reproduction means for recording and reproducing data onto and from said disk-shaped recording medium;

transport means for transporting said recording/reproduction means to a predetermined one of said recording tracks on said disk-shaped recording medium;

access control means for executing control to access data of an amount equivalent to one recording track by starting said access from a one of said sectors existing in said predetermined recording track as a first sector accessible to said recording/reproduction means transported to said predetermined recording track;

first error-correction-code generation means for generating a first error correction code for correcting an error generated in a corresponding sector of said accessed data; and second error-correction-code generation means for generating a second error correction code for correcting an error generated over a plurality of sectors of said predetermined recording track, wherein only one error correction code block including said generated first error correction code and said generated second error correction code is generated for each of said recording tracks.

2. The data-recording/reproduction apparatus according to claim 1, said data-recording/reproduction apparatus further comprising:

first error correction means for correcting an error generated in said corresponding sector of said accessed data based on said first error correction code; and second error correction means for correcting an error generated over the plurality of sectors of said predetermined recording track based on said second error correction code.

3. The data-recording/reproduction apparatus according to claim 1 wherein, at a time to write data onto said disk-shaped recording medium, said access control means sequentially assigns relative position addresses to said sectors on said predetermined recording track in an order starting with a one of said sectors that becomes writable first in said predetermined track.

4. The data-recording/reproduction apparatus according to claim 1 wherein, at a time to read out pieces of data from said disk-shaped recording medium, said recording/reproduction means is transported to said predetermined recording track and said access control means sequentially reads out each of said pieces of data from one of said sectors in said predetermined recording track in an order starting with a one of said sectors that becomes readable first in said predetermined recording track and relocates said pieces of data based on information on relative positions each assigned to one of said sectors.

5. The data-recording/reproduction apparatus according to claim 4, said data-recording/reproduction apparatus further having comprising storage means for storing said pieces of data read out from said disk-shaped recording medium, wherein control is executed to store said pieces of data read out from said disk-shaped recording medium at predetermined locations in said storage means based on said information on relative positions.

6. The data-recording/reproduction apparatus according to claim 4, said data-recording/reproduction apparatus further comprising storage means for storing said pieces of data read out from said disk-shaped recording medium, wherein control is executed so that, after said pieces of data for one track have been stored in said storage means, said pieces of data are read out from said storage means based on said information on relative positions.

7. The data-recording/reproduction apparatus according to claim 4, said data-recording/reproduction apparatus further comprising storage means for storing said pieces of data read out from said disk-shaped recording medium, wherein:

said pieces of data read out from said predetermined recording track are stored in said storage means sequentially;

as one of said pieces of data is read out from one of said sectors included in said predetermined recording track as a sector determined to be a first sector based on said information on relative positions, said pieces of data read out from said first sector and said sectors following said first sector are output; and then, said pieces of data already stored in said storage means are output.

8. The data-recording/reproduction apparatus according to claim 1, wherein said second error-correction-code generation means generates a second error correction code by adoption of using a Reed-Solomon encode method.

9. The data-recording/reproduction apparatus according to claim 1, wherein said disk-shaped recording medium conforms to a Zone Bit Recording method in which a number of sectors included in each of said recording tracks is varied in dependence on a location of said recording track in a radial direction of said disk-shaped recording medium.

10. The data-recording/reproduction apparatus according to claim 1, wherein an interleave structure is adopted as one of the unit of said second error correction code and the unit of said first error correction code.

11. The data-recording/reproduction apparatus according to claim 2, further comprising selection means, wherein an error is corrected by using one of:

both said first error correction means and said second error correction means;

only said first error correction means; and only said second error correction means.

12. The data-recording/reproduction apparatus according to claim 1, wherein said data to be recorded on said disk-shaped recording medium includes at least a piece of data for which only said first error correction code is generated by said first error-correction-code generation means.

13. The data-recording/reproductive apparatus according to claim 1, wherein said second error-correction-code generation means adopts an error correction block configuration changing from zone to zone on said disk-shaped recording medium.

14. The data recording/reproduction apparatus according to claim 13, wherein said error correction block configuration is changed by changing one of a configuration of the unit of said second error correction code and a configuration of the unit of said first error correction code.

15. A data-recording/reproduction method for recording data onto a disk-shaped recording medium having concentric recording tracks each divided into sectors by splitting said data into predetermined quantities, each to be recorded onto one of said sectors, and each used as a minimum access unit, and for reproducing said data from said disk-shaped recording medium, said data-recording/reproduction method comprising the steps of:

recording and reproducing data onto and from said disk-shaped recording medium to and from a predetermined one of said recording tracks on said disk-shaped recording medium;

executing control to access data of an amount equivalent to one recording track by starting said access from a one of said sectors existing in said predetermined recording track as a first sector accessible to said recording/reproduction means transported to said predetermined recording track;

generating only one error correction block including a first error correction code and a second error correction code for each of said recording tracks in an operation recording data to said disk-shaped recording medium, said first error correction code correcting an error generated in a corresponding sector of said accessed data, said second error correction code correcting an error generated over a plurality of sectors of said predetermined recording track.

16. The data-recording/reproduction method according to claim 15, wherein in an operation to reproduce data from said disk-shaped recording medium errors are corrected based on said first error correction code and other errors are corrected based on said second error correction code.

17. A data-recording/reproduction apparatus comprising:

access control means for executing control to access data of an amount equivalent to one recording track by starting said access from a one of a plurality of sectors existing in a predetermined recording track as a first sector accessible to a recording/reproduction means transported to said predetermined recording track;

first error-correction-code generation means for generating a first-error correction code for correcting an error generated in a corresponding sector of said accessed data; and second error-correction-code generation means for generating a second error correction code for correcting an error generated over a plurality of sectors of said predetermined recording track, wherein only one error correction code block including said generated first error correction code and said generated second error correction code is generated for each recording track.

* * * * *